US012657630B2

(12) United States Patent
Hanson et al.

(10) Patent No.: US 12,657,630 B2
(45) Date of Patent: *Jun. 16, 2026

(54) TOTAL LOSS EVALUATION AND HANDLING SYSTEM AND METHOD

(71) Applicant: Allstate Insurance Company, Northbrook, IL (US)

(72) Inventors: Randall M. Hanson, Lake Ozark, MO (US); Joel DeWall, Libertyville, IL (US); Jamin Ejupi, Libertyville, IL (US)

(73) Assignee: Allstate Insurance Company, Northbrook, IL (US)

( * ) Notice: Subject to any disclaimer, the term of this patent is extended or adjusted under 35 U.S.C. 154(b) by 44 days.

This patent is subject to a terminal disclaimer.

(21) Appl. No.: 18/336,748

(22) Filed: Jun. 16, 2023

(65) Prior Publication Data

US 2023/0334571 A1 Oct. 19, 2023

Related U.S. Application Data

(63) Continuation of application No. 17/827,174, filed on May 27, 2022, now Pat. No. 11,682,077, which is a continuation of application No. 17/227,542, filed on Apr. 12, 2021, now Pat. No. 11,348,175, which is a continuation of application No. 16/857,459, filed on
(Continued)

(51) Int. Cl.
 *G06Q 30/00* (2023.01)
 *G06Q 40/04* (2012.01)

(52) U.S. Cl.
 CPC .................................. *G06Q 40/04* (2013.01)

(58) Field of Classification Search
 CPC ...................................................... G06Q 40/04
 USPC .............. 705/4, 1.1, 36 R, 44, 26.4, 30, 39; 701/101, 19, 423, 70; 340/932, 444
 See application file for complete search history.

(56) References Cited

U.S. PATENT DOCUMENTS 4,638,289 A 1/1987 Zottnik
5,450,329 A 9/1995 Tanner
(Continued)

FOREIGN PATENT DOCUMENTS

AU 2002301438 B2 9/2006
AU 2007200869 A1 3/2007
(Continued)

OTHER PUBLICATIONS

ProQuestDialogNPL Search History.*
(Continued)

*Primary Examiner* — John H. Holly

(57) ABSTRACT

Aspects of the disclosure describe systems and methods for handling a loss involving an insured vehicle. A total loss evaluation and handling system receives vehicle state data and determines that a loss involving the vehicle has occurred. A total loss evaluator selects a set of total loss rules configured to determine whether the loss is a total loss. The total loss evaluator applies the total loss rules selected to the vehicle state data received and determines whether the loss is a total loss based on the total loss rules applied. A total loss handler obtains an estimated value of the vehicle and generates a settlement amount based on the estimated value. The total loss handler initiates a payment corresponding to the settlement amount as settlement for the total loss.

20 Claims, 6 Drawing Sheets

Related U.S. Application Data

Apr. 24, 2020, now Pat. No. 11,017,472, which is a continuation of application No. 14/602,969, filed on Jan. 22, 2015, now Pat. No. 10,713,717.

(56)        References Cited

U.S. PATENT DOCUMENTS

| | | | |
|---|---|---|---|
| 5,742,699 A | 4/1998 | Adkins et al. | |
| 5,950,169 A | 9/1999 | Borghesi et al. | |
| 6,027,415 A | 2/2000 | Takeda | |
| 6,060,989 A | 5/2000 | Gehlot | |
| 6,061,610 A | 5/2000 | Boer | |
| 6,076,028 A | 6/2000 | Donnelly et al. | |
| 6,141,611 A | 10/2000 | Mackey et al. | |
| 6,211,777 B1 | 4/2001 | Greenwood et al. | |
| 6,246,933 B1 | 6/2001 | Bague | |
| 6,262,657 B1 | 7/2001 | Okuda et al. | |
| 6,295,492 B1 | 9/2001 | Lang et al. | |
| 6,330,499 B1 | 12/2001 | Chou et al. | |
| 6,472,982 B2 | 10/2002 | Eida et al. | |
| 6,509,868 B2 | 1/2003 | Flick | |
| 6,594,579 B1 | 7/2003 | Lowrey et al. | |
| 6,611,740 B2 | 8/2003 | Lowrey et al. | |
| 6,641,038 B2 | 11/2003 | Gehlot et al. | |
| 6,701,234 B1 | 3/2004 | Vogelsang | |
| 6,732,020 B2 | 5/2004 | Yamagishi | |
| 6,732,031 B1 | 5/2004 | Lightner et al. | |
| 6,741,168 B2 | 5/2004 | Webb et al. | |
| 6,762,020 B1 | 7/2004 | Mack et al. | |
| 6,765,499 B2 | 7/2004 | Flick | |
| 6,798,356 B2 | 9/2004 | Flick | |
| 6,909,947 B2 | 6/2005 | Douros et al. | |
| 6,925,425 B2 | 8/2005 | Remboski et al. | |
| 6,946,966 B2 | 9/2005 | Koenig | |
| 6,980,313 B2 | 12/2005 | Sharif et al. | |
| 6,982,654 B2 | 1/2006 | Rau et al. | |
| 6,988,033 B1 | 1/2006 | Lowrey et al. | |
| 7,069,118 B2 | 6/2006 | Coletrane et al. | |
| 7,082,359 B2 | 7/2006 | Breed | |
| 7,092,803 B2 | 8/2006 | Kapolka et al. | |
| 7,113,127 B1 | 9/2006 | Banet et al. | |
| 7,119,669 B2 | 10/2006 | Lundsgaard et al. | |
| 7,129,826 B2 | 10/2006 | Nitz et al. | |
| 7,133,611 B2 | 11/2006 | Kaneko | |
| 7,143,290 B1 | 11/2006 | Ginter et al. | |
| 7,155,259 B2 | 12/2006 | Bauchot et al. | |
| 7,155,321 B2 | 12/2006 | Bromley et al. | |
| 7,174,243 B1 | 2/2007 | Lightner et al. | |
| 7,271,716 B2 | 9/2007 | Nou | |
| 7,305,293 B2 | 12/2007 | Flick | |
| 7,348,895 B2 | 3/2008 | Lagassey | |
| 7,477,968 B1 | 1/2009 | Lowrey et al. | |
| 7,565,230 B2 | 7/2009 | Gardner et al. | |
| 7,671,727 B2 | 3/2010 | Flick | |
| 7,702,529 B2 | 4/2010 | Wahlbin et al. | |
| 7,715,961 B1 | 5/2010 | Kargupta | |
| 7,747,365 B1 | 6/2010 | Lowrey et al. | |
| 7,792,690 B2 | 9/2010 | Wahlbin et al. | |
| 7,809,586 B2 | 10/2010 | Wahlbin et al. | |
| 7,885,829 B2 | 2/2011 | Danico et al. | |
| 7,890,355 B2 | 2/2011 | Gay et al. | |
| 7,970,834 B2 | 6/2011 | Daniels et al. | |
| 8,000,979 B2 | 8/2011 | Blom | |
| 8,014,789 B2 | 9/2011 | Breed | |
| 8,019,629 B1 | 9/2011 | Medina et al. | |
| 8,041,635 B1 | 10/2011 | Garcia et al. | |
| 8,069,060 B2 | 11/2011 | Tipirneni | |
| 8,090,598 B2 | 1/2012 | Bauer et al. | |
| 8,140,358 B1 | 3/2012 | Ling et al. | |
| 8,214,100 B2 | 7/2012 | Lowrey et al. | |
| 8,229,759 B2 | 7/2012 | Zhu et al. | |
| 8,239,220 B2 | 8/2012 | Kidd et al. | |
| 8,255,243 B2 | 8/2012 | Raines et al. | |
| 8,255,275 B2 | 8/2012 | Collopy et al. | |
| 8,260,639 B1 | 9/2012 | Medina et al. | |
| 8,271,187 B2 | 9/2012 | Taylor et al. | |
| 8,285,588 B2 | 10/2012 | Postrel | |
| 8,311,858 B2 | 11/2012 | Everett et al. | |
| 8,321,086 B2 | 11/2012 | Park et al. | |
| 8,330,593 B2 | 12/2012 | Golenski | |
| 8,364,505 B1 | 1/2013 | Kane et al. | |
| 8,370,254 B1 | 2/2013 | Hopkins et al. | |
| 8,392,280 B1 | 3/2013 | Kilshaw | |
| 8,401,877 B2 | 3/2013 | Salvagio | |
| 8,403,225 B2 | 3/2013 | Sharra et al. | |
| 8,417,604 B2 | 4/2013 | Orr et al. | |
| 8,423,239 B2 | 4/2013 | Blumer et al. | |
| 8,432,262 B2 | 4/2013 | Talty et al. | |
| 8,433,590 B2 | 4/2013 | Prescott | |
| 8,438,049 B2 | 5/2013 | Ranicar et al. | |
| 8,442,508 B2 | 5/2013 | Harter et al. | |
| 8,447,459 B2 | 5/2013 | Lowrey et al. | |
| 8,452,486 B2 | 5/2013 | Banet et al. | |
| 8,463,488 B1 | 6/2013 | Hart | |
| 8,466,781 B2 | 6/2013 | Miller et al. | |
| 8,478,514 B2 | 7/2013 | Kargupta | |
| 8,484,113 B2 | 7/2013 | Collopy et al. | |
| 8,494,938 B1 | 7/2013 | Kazenas | |
| 8,510,133 B2 | 8/2013 | Peak et al. | |
| 8,510,200 B2 | 8/2013 | Pearlman et al. | |
| 8,527,135 B2 | 9/2013 | Lowrey et al. | |
| 8,547,435 B2 | 10/2013 | Mimar | |
| 8,554,584 B2 | 10/2013 | Hargroder | |
| 8,571,895 B1 | 10/2013 | Medina et al. | |
| 8,577,703 B2 | 11/2013 | Mcclellan et al. | |
| 8,595,034 B2 | 11/2013 | Bauer et al. | |
| 8,598,977 B2 | 12/2013 | Maalouf et al. | |
| 8,620,692 B2 | 12/2013 | Collopy et al. | |
| 8,630,768 B2 | 1/2014 | Mcclellan et al. | |
| 8,633,985 B2 | 1/2014 | Haynes et al. | |
| 8,635,091 B2 | 1/2014 | Amigo et al. | |
| 8,645,014 B1 | 2/2014 | Kozlowski et al. | |
| 8,712,893 B1 | 4/2014 | Brandmaier et al. | |
| 8,788,297 B2 * | 7/2014 | Thomas | G06Q 40/08 705/30 |
| 8,788,301 B1 | 7/2014 | Marlow et al. | |
| 8,788,406 B2 | 7/2014 | Roll et al. | |
| 8,799,034 B1 * | 8/2014 | Brandmaier | G07C 5/008 705/4 |
| 8,903,852 B1 | 12/2014 | Pedregal et al. | |
| 8,935,036 B1 | 1/2015 | Christensen et al. | |
| 9,311,677 B2 | 4/2016 | Thomas et al. | |
| 9,325,807 B1 | 4/2016 | Meoli et al. | |
| 10,032,226 B1 | 7/2018 | Suizzo et al. | |
| 10,102,587 B1 | 10/2018 | Potter et al. | |
| 2002/0055861 A1 | 5/2002 | King et al. | |
| 2002/0063637 A1 | 5/2002 | Eida et al. | |
| 2002/0111725 A1 | 8/2002 | Burge | |
| 2002/0135679 A1 | 9/2002 | Scaman | |
| 2003/0154111 A1 | 8/2003 | Dutra et al. | |
| 2003/0212567 A1 | 11/2003 | Shintani et al. | |
| 2003/0233261 A1 | 12/2003 | Kawahara et al. | |
| 2004/0083123 A1 | 4/2004 | Wook-Bae | |
| 2004/0088090 A1 | 5/2004 | Wee | |
| 2004/0186744 A1 | 9/2004 | Lux | |
| 2004/0189493 A1 | 9/2004 | Estus et al. | |
| 2004/0205622 A1 | 10/2004 | Jones et al. | |
| 2005/0021374 A1 | 1/2005 | Allahyari | |
| 2005/0161505 A1 | 7/2005 | Yin et al. | |
| 2005/0216487 A1 | 9/2005 | Fisher et al. | |
| 2005/0267774 A1 | 12/2005 | Merritt et al. | |
| 2005/0278082 A1 | 12/2005 | Weekes | |
| 2006/0224305 A1 | 10/2006 | Ansari et al. | |
| 2006/0226960 A1 | 10/2006 | Pisz et al. | |
| 2007/0009136 A1 | 1/2007 | Pawlenko et al. | |
| 2007/0043594 A1 | 2/2007 | Lavergne | |
| 2007/0136162 A1 | 6/2007 | Thibodeau et al. | |
| 2007/0162308 A1 | 7/2007 | Peters | |
| 2007/0288268 A1 | 12/2007 | Weeks | |
| 2008/0027761 A1 | 1/2008 | Bracha | |
| 2008/0242261 A1 | 10/2008 | Shimanuki et al. | |
| 2008/0294690 A1 | 11/2008 | McClellan et al. | |
| 2009/0106052 A1 | 4/2009 | Moldovan | |
| 2009/0156243 A1 | 6/2009 | Lichtenfeld et al. | |
| 2009/0164504 A1 | 6/2009 | Flake et al. | |

(56) References Cited

U.S. PATENT DOCUMENTS

| | | |
|---|---|---|
| 2009/0198772 A1 | 8/2009 | Kim et al. |
| 2009/0254241 A1 | 10/2009 | Basir |
| 2009/0265193 A1 | 10/2009 | Collins et al. |
| 2009/0265385 A1 | 10/2009 | Beland et al. |
| 2010/0030540 A1 | 2/2010 | Choi et al. |
| 2010/0030586 A1 | 2/2010 | Taylor et al. |
| 2010/0131300 A1 | 5/2010 | Collopy et al. |
| 2010/0138242 A1 | 6/2010 | Ferrick et al. |
| 2010/0161491 A1 | 6/2010 | Bauchot et al. |
| 2010/0174564 A1 | 7/2010 | Stender et al. |
| 2011/0015946 A1 | 1/2011 | Buckowsky et al. |
| 2011/0070834 A1 | 3/2011 | Griffin et al. |
| 2011/0077028 A1 | 3/2011 | Wilkes et al. |
| 2011/0112870 A1 | 5/2011 | Berg et al. |
| 2011/0153369 A1 | 6/2011 | Feldman et al. |
| 2011/0161116 A1 | 6/2011 | Peak et al. |
| 2011/0161118 A1 | 6/2011 | Borden et al. |
| 2011/0185178 A1 | 7/2011 | Gotthardt |
| 2011/0213628 A1 | 9/2011 | Peak et al. |
| 2011/0281564 A1 | 11/2011 | Armitage et al. |
| 2011/0307188 A1 | 12/2011 | Peng et al. |
| 2011/0313936 A1 | 12/2011 | Sieger |
| 2012/0028680 A1 | 2/2012 | Breed |
| 2012/0047203 A1 | 2/2012 | Brown et al. |
| 2012/0072243 A1 | 3/2012 | Collins et al. |
| 2012/0076437 A1 | 3/2012 | King |
| 2012/0084179 A1 | 4/2012 | Mcrae et al. |
| 2012/0109690 A1 | 5/2012 | Weinrauch et al. |
| 2012/0109692 A1 | 5/2012 | Collins et al. |
| 2012/0119936 A1 | 5/2012 | Miller et al. |
| 2012/0136802 A1 | 5/2012 | Mcquade et al. |
| 2012/0150412 A1 | 6/2012 | Yoon et al. |
| 2012/0191476 A1 | 7/2012 | Reid et al. |
| 2012/0197486 A1 | 8/2012 | Elliott |
| 2012/0197669 A1 | 8/2012 | Kote et al. |
| 2012/0209631 A1 | 8/2012 | Roscoe et al. |
| 2012/0209632 A1 | 8/2012 | Kaminski et al. |
| 2012/0230548 A1 | 9/2012 | Calman et al. |
| 2012/0232995 A1 | 9/2012 | Castro et al. |
| 2012/0239417 A1 | 9/2012 | Pourfallah et al. |
| 2012/0242503 A1 | 9/2012 | Thomas et al. |
| 2012/0250938 A1 | 10/2012 | Dehart |
| 2012/0259665 A1 | 10/2012 | Pandhi et al. |
| 2012/0290150 A1 | 11/2012 | Doughty et al. |
| 2012/0303392 A1 | 11/2012 | Depura et al. |
| 2012/0316893 A1 | 12/2012 | Egawa |
| 2012/0330687 A1 | 12/2012 | Hilario et al. |
| 2013/0006674 A1 | 1/2013 | Bowne et al. |
| 2013/0006675 A1 | 1/2013 | Bowne et al. |
| 2013/0018676 A1 | 1/2013 | Fischer et al. |
| 2013/0030642 A1 | 1/2013 | Bradley et al. |
| 2013/0033386 A1 | 2/2013 | Zlojutro |
| 2013/0035964 A1 | 2/2013 | Roscoe et al. |
| 2013/0046510 A1 | 2/2013 | Bowne et al. |
| 2013/0054274 A1 | 2/2013 | Katyal |
| 2013/0073318 A1 | 3/2013 | Feldman et al. |
| 2013/0073321 A1 | 3/2013 | Hofmann et al. |
| 2013/0138267 A1 | 5/2013 | Hignite et al. |
| 2013/0151288 A1 | 6/2013 | Bowne et al. |
| 2013/0166098 A1 | 6/2013 | Lavie et al. |
| 2013/0166326 A1 | 6/2013 | Lavie et al. |
| 2013/0179027 A1 | 7/2013 | Mitchell |
| 2013/0179198 A1* | 7/2013 | Bowne ..................... G07C 5/08 |
| | | 705/4 |
| 2013/0190967 A1 | 7/2013 | Hassib et al. |
| 2013/0197945 A1 | 8/2013 | Anderson |
| 2013/0204645 A1 | 8/2013 | Lehman et al. |
| 2013/0211660 A1 | 8/2013 | Mitchell |
| 2013/0226397 A1 | 8/2013 | Kuphal et al. |
| 2013/0289819 A1 | 10/2013 | Hassib et al. |
| 2013/0290036 A1 | 10/2013 | Strange |
| 2013/0297353 A1 | 11/2013 | Strange et al. |
| 2013/0297418 A1 | 11/2013 | Collopy et al. |
| 2013/0300552 A1 | 11/2013 | Chang |
| 2013/0304517 A1 | 11/2013 | Florence |
| 2013/0311209 A1 | 11/2013 | Kaminski et al. |
| 2013/0316310 A1 | 11/2013 | Musicant et al. |
| 2013/0317860 A1 | 11/2013 | Schumann, Jr. |
| 2013/0339062 A1 | 12/2013 | Brewer et al. |
| 2014/0025404 A1 | 1/2014 | Jackson et al. |
| 2014/0039934 A1 | 2/2014 | Rivera |
| 2014/0039935 A1 | 2/2014 | Rivera |
| 2014/0058956 A1 | 2/2014 | Raines et al. |
| 2014/0081673 A1 | 3/2014 | Batchelor |
| 2014/0081675 A1 | 3/2014 | Ives et al. |
| 2014/0081876 A1 | 3/2014 | Schulz |
| 2014/0100889 A1 | 4/2014 | Tofte |
| 2014/0111542 A1 | 4/2014 | Wan |
| 2014/0197939 A1 | 7/2014 | Stefan et al. |
| 2014/0200924 A1 | 7/2014 | Gilbert et al. |
| 2014/0200929 A1 | 7/2014 | Fitzgerald et al. |
| 2014/0244312 A1 | 8/2014 | Gray et al. |
| 2015/0045983 A1 | 2/2015 | Fraser et al. |
| 2015/0058045 A1 | 2/2015 | Santora |
| 2015/0127570 A1 | 5/2015 | Doughty et al. |
| 2015/0170287 A1 | 6/2015 | Tirone et al. |
| 2015/0213556 A1 | 7/2015 | Haller, Jr. |
| 2017/0293894 A1 | 10/2017 | Taliwal et al. |
| 2018/0108189 A1 | 4/2018 | Park et al. |

FOREIGN PATENT DOCUMENTS

| | | | |
|---|---|---|---|
| CA | 2658219 A1 | 1/2008 |
| DE | 10 2010 001 006 A1 | 7/2011 |
| EP | 1 826 734 A1 | 8/2007 |
| EP | 1 965 361 A2 | 9/2008 |
| EP | 2 481 037 A1 | 8/2012 |
| GB | 2 486 384 A | 6/2012 |
| GB | 2 488 956 A | 9/2012 |
| KR | 20020067246 A | 8/2002 |
| WO | WO-02/079934 A2 | 10/2002 |
| WO | WO-2012/045128 A1 | 4/2012 |
| WO | WO-2012/067640 A1 | 5/2012 |
| WO | WO-2012/097441 A1 | 7/2012 |
| WO | WO-2012/106878 A1 | 8/2012 |
| WO | WO-2012/173655 A1 | 12/2012 |
| WO | WO-2012/174590 A1 | 12/2012 |
| WO | WO-2013/072867 A1 | 5/2013 |

OTHER PUBLICATIONS ip.com NPL Search History.*

"Frost & Sullivan: Using Mobile Solutions to Improve Insurance Sector Performance," PR Newswire, retrieved from https://www.prnewswire.com/news-releases/frost--sullivan-using-mobile-solutions-to-improve-insurance-sector-performance-134029338.html, 3 pages (2011).

Angellist, "Genie Cam by Selka Inc.," retrieved from https://angel.co/company/geniecam, 6 pages (2012).

Arnold, et al., "Information-Sharing in Out-of-Hospital Disaster Response: The Future Role of Information Technology," Prehospital and Disaster Medicine 19(3), pp. 201-207 (2004).

Bachman & Preziotti, "Automated Collision Notification (ACN) Field Operational Test (FOT) Evaluation Report," National Highway Traffic Safety Administration, retrieved from http://www.nhtsa.gov/DOT/NHTSA/NRD/Multimedia/PDFs/Crash%20Avoidance/2001/ACNEvaluation.pdf, 84 pages (2001).

BoxyMo, "BoxyMo Telematics," retrieved from https://www.boxymo.ie/telematics.aspx, 3 pages (2014).

Boyle, "Scan Someone's License Plate and Message Them Instantly with New Bump App," Popular Science, retrieved from https://www.popsci.com/cars/article/2010-09/social-networking-site-uses-license-plates-connect-drivers/, 4 pages (2010).

Bush, "License plate readers allow police to quickly scan, check for offenders," The Topeka Capital-Journal, retrieved from https://www.cjonline.com/article/20130317/NEWS/303179882, 3 pages (2013).

Carney, "Trends 2013: North American Insurance eBusiness And Channel Strategy," Forrester, retrieved from https://www.forrester.com/report/trends-2013-north-american-insurance-ebusiness-and-channel-strategy/RES94742, 25 pages (2013).

(56)                    References Cited

OTHER PUBLICATIONS

Ceska Pojistovna, "Comprehensive motor vehicle insurance," T. No. 7506 Jan. 2014 MHA, 30 pages (2014).

Comcare Alliance, "Automatic Crash Notification," National Highway Traffic Safety Administration, retrieved from http://www.nhtsa.gov/DOT/NHTSA/NRD/Articles/EDR/PDF/Research/ComCARE_ACN_System.pdf, 2 pages (no date, accessed 2013).

Deloitte, "Insurance Tech Trends 2013: Elements of postdigital," retrieved from https://www2.deloitte.com/content/dam/Deloitte/cn/Documents/about-deloitte/aff2014/deloitte-cn-aff2014-insurancetechtrends2013-en-040114.pdf, 100 pages (2013).

Domanico, "Geico Releases Insurance Glovebox App for Android," retrieved from http://androidandme.com/2010/08/applications/geico-releases-insurance-glovebox-app-for-android/ (2010).

Donnelly, et al., "The Automated Collision Notification System," National Highway Traffic Safety Administration, retrieved from http://www.nhtsa.gov/DOT/%20NHTSA/NRD/Articles/EDR/PDF/Research/Automated_Collision_Notification_System.pdf, 14 pages (no date, accessed 2013).

Drive Smart, "Telematics (also known as black box) insurance," retrieved from https://drivesmartinsurance.co.uk/telematics/, 3 pages (2014).

Dyer, "Fraunhofer offers secure NFC keys that can be shared via QR codes," NFC World, retrieved from https://www.nfcw.com/2013/03/20323184/fraunhofer-offers-secure-nfc-keys-that-can-be-shared-via-qr-codes/, 4 pages (2013).

Experienced Criminal Lawyers, "Automatic License Plate Recognition (ALPR) Scanning Systems," retrieved from https://experiencedcriminallawyers.com/articles/automatic-license-plate-recognition-alpr-scanning-systems/, 3 pages (no date, accessed 2013).

Final Office Action on U.S. Appl. No. 14/602,969 dated Apr. 26, 2018, 29 pages.

Final Office Action on U.S. Appl. No. 14/602,969 dated Jun. 14, 2019, 10 pages.

Final Office Action on U.S. Appl. No. 15/493,685 dated Feb. 5, 2020, 47 pages.

Freeman, "How OnStar Works," retrieved from https://auto.howstuffworks.com/onstar.htm, 15 pages (2006).

Freeman, "This App Turns Smartphones Into Safe Driving Tools," Mashable, retrieved from https://mashable.com/archive/drivescribe-app-safe-driving, 3 pages (2012).

Funke, et al., "Automated Collision Notification (ACN) Field Operational Test (FOT) Final Report," National Highway Traffic Safety Administration, retrieved from https://www.nhtsa.gov/DOT/NHTSA/NRD/Multimedia/PDFs/Crash%20Avoidance/2000/ACNFinal.pdf, 55 pages (2000).

Girls Drive Better, "Telematics: FAQs," retrieved from https://girlsdrivebetter.com/telematics-insurance-faqs/, 5 pages (2014).

Google Play Store , "GEICO App," retrieved from https://play.google.com/store/apps/details?id=com.geico.mobile&hl=en, 3 pages (2013).

Hakim, "Insurance telematics: What is it? And why we should care.," Versik, retrieved from https://www.verisk.com/insurance/visualize/insurance-telematics-what-is-it-and-why-we-should-care/, 5 pages (2013).

Harding, "The 'Alva Cape' and the Automatic Identification System: The Use of VHF in Collision Avoidance at Sea," The Journal of Navigation 55(3), pp. 431-442 (2002).

IDL Services, "QR Code," retrieved from http://www.internationaler-fuehrerschein.com/en/the-idd/qr-code-quick-response-code-feature-in-the-idd.html on May 21, 2013.

Jeevagan, et al., "RFID based vehicle identification during collisions," IEEE 2014 Global Humanitarian Technology Conference, 5 pages (2014).

Kardas & Tunali, "Design and implementation of a smart card based healthcare information system," Computer Methods and Programs in Biomedicine 81(1), pp. 66-78 (2006).

Krishna, et al., "Design & Development of a GSM Based Vehicle Theft Control System And Accident Detection by Wireless Sensor Network," International Journal of Emerging trends in Engineering and Development 2(5), pp. 529-540 (2012).

Lahausse, et al., "The potential for automatic crash notification systems to reduce road fatalities," Annals of Advances in Automotive Medicine 52, pp. 85-92 (2008).

Lemon Wallet, "Privacy Policy," retrieved from http://lemon.com/privacy on May 20, 2013.

Maciag, "Motor Accident Insurance and Systems of Compensation," University of Alberta Thesis, 262 pages (1980).

Maxwell, "New Idea: QR Codes For License Plates," retrieved from http://andrewcmaxwell.com/2011/02/new-idea-qr-codes-for-license-plates, 6 pages (2011).

Mercedes-Benz, "mbrace: Safety & Security Services," retrieved from https://www.mbusa.com/vcm/MB/DigitalAssets/pdfmb/mbrace_Cut_Sheet_All_4_12_12_.pdf, 37 pages (2012).

Microsoft, "Microsoft Tag Implementation Guide," retrieved from http://tag.microsoft.com/resources/implementationguide.aspx, 28 pages (2010).

Naujoks, et al., "For insurance companies, the day of digital reckoning," Bain & Company, retrieved from https://www.bain.com/insights/for-insurance-companies-the-day-of-digital-reckoning/, 16 pages (2013).

Notice of Allowance for U.S. Appl. No. 17/227,542 dated Jan. 31, 2022, 11 pages.

Notice of Allowance on U.S. Appl. No. 14/602,969 dated May 14, 2020, 10 pages.

Notice of Allowance on U.S. Appl. No. 15/493,685 dated Oct. 15, 2020, 8 pages.

Notice of Allowance on U.S. Appl. No. 17/166,335 dated Apr. 6, 2023, 9 pages.

Notice of Allowance on U.S. Appl. No. 17/166,335 dated Feb. 2, 2023, 9 pages.

Notice of Allowance on U.S. Appl. No. 17/166,335 dated Sep. 8, 2022, 9 pages.

O'Reilly, "Encrypted QR Codes," retrieved from https://qrworld.wordpress.com/2011/11/27/encrypted-qr-codes/, 5 pages (2011).

Office Action for U.S. Appl. No. 17/166,335 dated Apr. 6, 2022, 19 pages.

Office Action on U.S. Appl. No. 14/602,969 dated Nov. 26, 2018, 27 pages.

Office Action on U.S. Appl. No. 14/602,969 dated Sep. 21, 2017, 31 pages.

Office Action on U.S. Appl. No. 15/493,685 dated Jul. 29, 2019, 39 pages.

Office Action on U.S. Appl. No. 17/166,335 dated Dec. 27, 2022, 18 pages.

Office Action on U.S. Appl. No. 17/827,174 dated Oct. 14, 2022, 7 pages.

Onstar, "Automatic Crash Response, Car Safety, & Emergency Services," retrieved from https://www.onstar.com/web/portal/emergencyexplore?tab=g=1 (no date, accessed 2013).

Out-Law Analysis, "Telematics data sharing, competition law and privacy rights," Pinset Masons, retrieved from https://www.pinsentmasons.com/out-law/analysis/telematics-data-sharing-competition-law-and-privacy-rights, 5 pages (2014).

Proquest, "Search Strategy from Dialog—Jan. 1, 2022 20:29," Scientific and Technical Information Center, 4 pages (2022).

Proquest, "Search Strategy from Dialog—Jan. 2, 2021 23:14," 4 pages (2022).

Proquest, "Search Strategy from Dialog—Oct. 8, 2022 22:25," Scientific and Technical Information Center, 4 pages (2022).

Quiroga, "Car Total Loss Evaluation Part IV," retrieved from http://www.auto-insurance-claim-advice.com/car-total-loss-2.html, 8 pages (2017).

Qwiktag, "New Technology Security Risks: QR codes and Near Field Communication," retrieved from http://www.qwiktag.com/index.php/knowledge-base/150-technology-security-risks-qr-codes on Nov. 13, 2013.

Samsung, "Near Field Communication: A Simple Exchange of Information," retrieved from https://www.samsung.com/us/article/near-field-communication-a-simple-exchange-of-information/ on May 21, 2013.

(56)    References Cited

OTHER PUBLICATIONS

SAS, "Telematics: How Big Data Is Transforming the Auto Insurance Industry," SAS White Paper, 12 pages (2013).

Schmitt, "License Plate Scanner Obsoletes Meter Maid," The Truth About Cars, retrieved from https://www.thetruthaboutcars.com/2011/02/license-plate-scanner-obsoletes-meter-maid/, 3 pages (2011).

Smith, "Car Insurance Firms Revving up Mobile App Features," Insurance.com, retrieved from https://www.insurance.com/auto-insurance/auto-insurance-basics/car-insurance-mobile-apps.htm, 3 pages (2012).

Spevacek, et al., "Additional insured and indemnification issues affecting the insurance industry, coverage counsel, and defense counsel—legal advice and practice pointers," FDCC Quarterly 52(1), pp. 3-101 (2001).

Sunrise Signs, "Vehicle Wrap Trends: What are QR Codes and why do I need one?," retrieved from https://www.sunrisesigns.com/our-blog/bid/34661/Vehicle-Wrap-Trends-What-are-QR-Codes-and-why-do-I-need-one, 4 pages (2010).

Thompson, et al., "Using Smartphones to Detect Car Accidents and Provide Situational Awareness to Emergency Responders," International Conference on Mobile Wireless Middleware, Operating Systems, and Applications, Mobilware 2010, pp. 29-42 (2010).

TMC News, "ATX Launches Enhanced Automatic Collision Notification for BMW," retrieved from http://www.tmcnet.com/2009/01/11/3905139.htm, 2 pages (2009).

Travelers, "Understanding Total Loss," retrieved from https://www.travelers.com/claims/guides/understanding-total-loss, 4 pages (2017).

Vemoco, "What is insurance telematics?," retrieved from https://vemoco.com/en/insurance, 4 pages (2014).

Verma, et al., "A Study of US Crash Statistics from Automated Crash Notification Data," 20th International Technical Conference on the Enhanced Safety of Vehicles, pp. 1-5 (2007).

Weiss, et al., "Top 10 Technology Trends Impacting Life and P&C Insurers in 2013," Gartner, 19 pages (2013).

Wikipedia, "Bump (application)," retrieved from https://en.wikipedia.org/wiki/Bump_(application) on Aug. 29, 2013.

* cited by examiner

100

200

TOTAL LOSS EVALUATION AND HANDLING SYSTEM AND METHOD

CROSS-REFERENCE TO RELATED APPLICATIONS

This application is a continuation of U.S. patent application Ser. No. 17/827,174, filed May 27, 2022, which is a continuation of U.S. patent application Ser. No. 17/227,542, filed Apr. 12, 2021 (now U.S. Pat. No. 11,348,175), which is a continuation of U.S. patent application Ser. No. 16/857,459, filed Apr. 24, 2020 (now U.S. Pat. No. 11,017,472), which is a continuation of U.S. patent application Ser. No. 14/602,969, filed Jan. 22, 2015 (now U.S. Pat. No. 10,713,717). The contents of these applications are incorporated herein in their entirety by reference.

INCORPORATION BY REFERENCE

Commonly-owned U.S. Pat. No. 8,799,034 to Brandmaier, et al., entitled "Automated Accident Detection, Fault Attribution, and Claims Processing," which issued on Aug. 5, 2014, is incorporated by reference herein in its entirety.

BACKGROUND

Handling insurance claims can be a time-consuming and complex process for both the claimant and the claims processor. The claimant often starts the process with a first notice of loss to a claims processing office associated with an insurance company. Usually, a claims adjuster within the claims processing office is assigned to the case to assess the damage for which compensation is sought. The claims adjustment process can involve paperwork processing, telephone calls, and potentially face-to-face meetings between claimant and adjuster. In addition, time can elapse between a first notice of loss from the claimant and the final settlement of the claim.

From these claims adjustment efforts insurance companies may compile large volumes of information regarding the circumstances that led to a loss and determinations of whether an estimated cost to repair a damaged item exceeds the value of the item. From this information insurance companies may be able to derive statistics that correlate the circumstances resulting in a loss with the determination of whether the damaged item should be repaired or simply replaced. Therefore a need exists for new approaches that leverage such information to streamline claims processing.

SUMMARY

The following presents a simplified summary of the present disclosure in order to provide a basic understanding of some aspects of the disclosure. This summary is not an extensive overview of the disclosures. It is not intended to identify key or critical elements or to delineate the scope of the claimed subject matter. The following summary merely presents some concepts of the disclosure in a simplified form as a prelude to the more detailed description provided below.

A first aspect described herein provides a computer-implemented method of handling a loss involving an insured vehicle. A total loss evaluation and handling system may receive vehicle state data associated with an insured vehicle. The total loss evaluation and handling system may determine that a loss involving the vehicle has occurred, and a total loss evaluator may select a set of total loss rules that are configured to determine whether the loss is a total loss. The total loss evaluator may apply the total loss rules selected to the vehicle state data received and determine whether the loss is a total loss based on the total loss rules applied. A total loss handler may obtain an estimated value of the vehicle and generate a settlement amount based on the estimated value. The total loss handler may then initiate a payment corresponding to the settlement amount to an individual associated with the insured vehicle as settlement for the total loss.

A second aspect described herein provides a total loss evaluation and handling system. The total loss evaluation and handling system may include at least one processor and a vehicle state data store that stores vehicle state data associated with an insured vehicle. A total loss evaluator may determine that a loss involving the insured vehicle has occurred and select a set of total loss rules configured to determine whether the loss is a total loss. The total loss evaluator may apply the total loss rules selected to the vehicle state data received and determine that the loss is a total loss based on the total loss rules applied. A total loss handler may be configured to obtain an estimated value of the insured vehicle and generate a settlement amount based on the estimated value. The total loss handler may then initiate a payment corresponding to the settlement amount to an individual associated with the insured vehicle as settlement for the total loss.

A third aspect described herein provides an apparatus for handling a loss involving an insured vehicle. A total loss evaluation and handling system may receive vehicle state data associated with an insured vehicle and determine that a loss involving the vehicle has occurred. A total loss evaluator may select a set of total loss rules configured to determine whether the loss is a total loss and apply the total loss rules selected to the vehicle state data received. The total loss evaluator may determine that the loss is a total loss based on the total loss rules applied. A total loss handler may obtain an estimated value of the vehicle, generate a settlement amount based on the estimated value, and initiate a payment corresponding to the settlement amount to the individual as settlement for the total loss.

The details of these and other embodiments of the disclosure are set forth in the accompanying drawings and description below. Other features and advantages of aspects of the disclosure will be apparent from the description, drawings, and claims.

BRIEF DESCRIPTION OF THE DRAWINGS

The present disclosure is illustrated by way of example and is not limited in the accompanying figures in which like reference numerals indicate similar elements.

DETAILED DESCRIPTION

Figure 1:
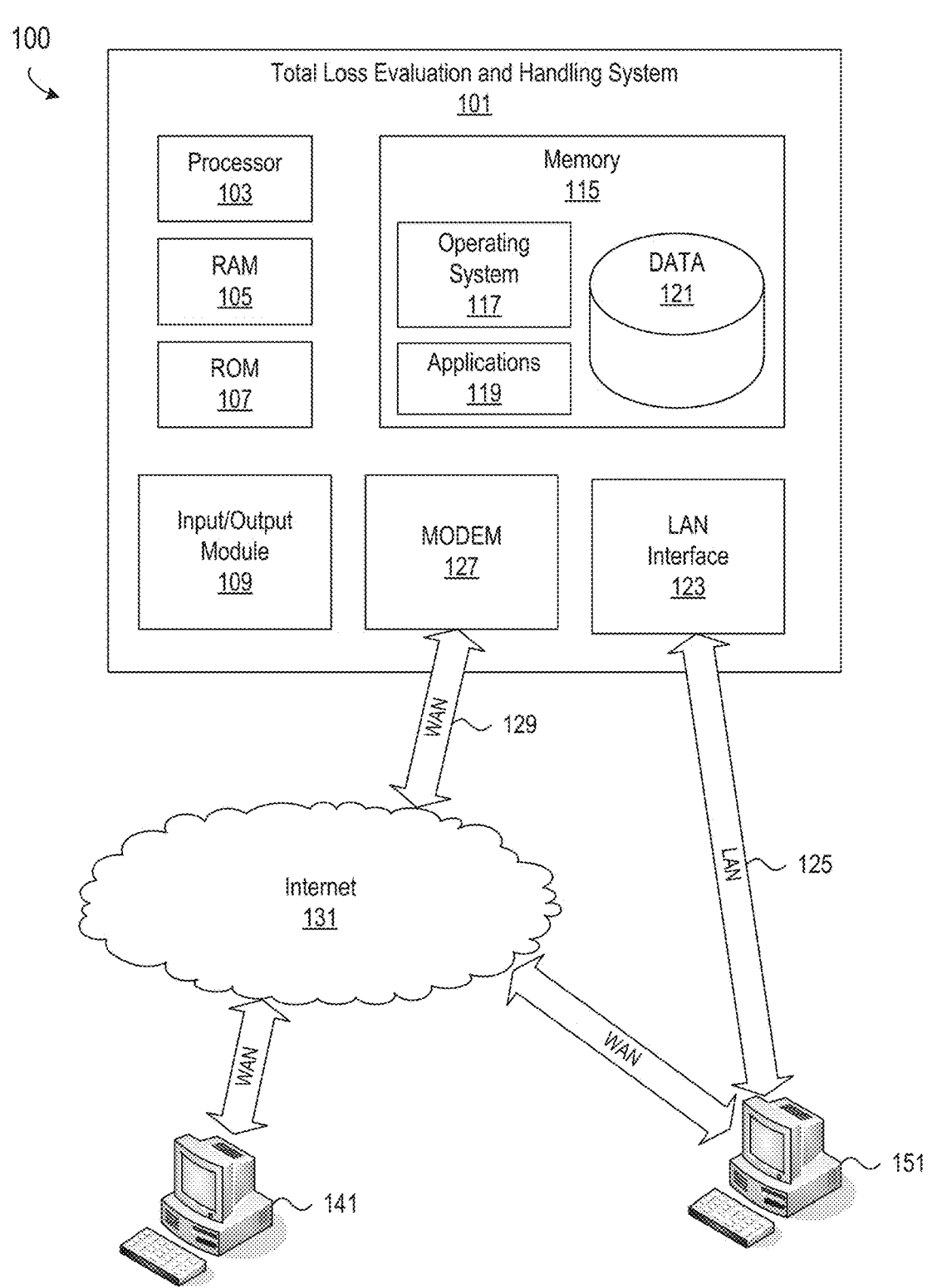
FIG. 1 is a block diagram of an operating environment in which various aspects of the disclosure may be implemented.

Systems and methods for evaluating and handling a total loss of an insured vehicle are provided. In particular a total loss evaluation and handling system as well as a method of evaluating and handling a loss associated with a vehicle are described below. The total loss evaluation and handling system may be utilized to determine, in an automated fashion, that a loss associated with a vehicle is a total loss of the vehicle and provide an insurance settlement to an individual associated with the vehicle, e.g., the vehicle owner. The total loss evaluation and handling system advantageously enables evaluation and handling of the loss without physically inspecting the vehicle.

As described in further detail below, the total loss evaluation and handling system applies a total loss ruleset to information related to the operation of the vehicle when the loss occurred or the condition of the vehicle following the loss. Based on the total loss rules applied, the total loss evaluation and handling system may automatically conclude with a high degree of certainty that the cost to repair the damage to the vehicle would exceed the estimated value of the vehicle. The total loss evaluation and handling system may thus initiate a payment to an individual associated with the vehicle as settlement for the loss without the need to manually process the total loss claim. It will be appreciated with the benefit of this disclosure that, in some scenarios, the total loss evaluation and handling system may receive notice of the loss associated with a vehicle, determine the loss is a total loss, and process a payment as settlement for the total loss all before the individual leaves the scene of a vehicle accident. Additional advantages will be appreciated upon review of the additional disclosures set forth in further detail below.

In accordance with various aspects of the disclosure, methods, computer-readable media, and apparatuses are disclosed in which the loss of a vehicle may be evaluated to determine whether the loss is a total loss of the vehicle. In certain aspects, a total loss evaluation and handling system evaluates the loss associated with a vehicle and handles providing settlement for that loss. The automated process may utilize various hardware components (e.g., processors, communication servers, memory devices, sensors, etc.) and related computer algorithms to evaluate the loss associated with a vehicle, determine whether the loss is a total loss, and provide settlement for that loss to an individual associated with the vehicle. Although the total loss evaluation and handling system is described below in the context of the total loss of a vehicle, aspects of the present disclosure may be employed to determine whether the loss of other types of items is a total loss.

For convenience the following terminology is adopted in the present disclosure. The condition of an item refers to the status of various characteristics associated with the item prior to any damage caused to the item during a particular loss event. In the context of a vehicle, the condition of the vehicle may include the status of the paint job, tire wear, body panels, and other characteristics associated with the vehicle that will be appreciated with the benefit of this disclosure. In this regard, the condition of the item may indicate how well the item was cared for prior to the loss event. Damage to an item refers to changes to the condition of the item during a particular loss event. In the context of a vehicle, damage to the vehicle may include changes to the condition of the tires (e.g., punctured), changes to the condition of the paint job (e.g., scratched), changes to the condition of the body panels (e.g., dented), and other changes to the condition of other characteristics associated with the vehicle that will be appreciated with the benefit of this disclosure. The state of the item may refer to the status of the item, its individual components, and its corresponding characteristics before or after a loss event. In this regard, the state of the item before a loss event refers to the condition of the item and the state of the item following a loss event refers to both the condition of the items as well as the damage that occurred during the loss event.

Following a loss event, the decision to repair the item or consider the item a total loss depends on the state of the item following the loss event. The condition of the item is used to determine the value of the item. The decision of whether to repair the item or consider the item a total loss thus depends on both the value of the item and the damage to the item that occurs during a loss event. For a low-value item, relatively less damage needs to occur for the item to be considered a total loss. For a high-value item, however, relatively more damage will need to occur before the item is determined to be a total loss. As described in further detail below, various factors influence the value of the item and thus the decision of whether the item should be repaired or considered a total loss. As used in this description, repairing an item includes restoring the item to the state it was in prior to the loss event, i.e., returning the item to its condition before the loss event occurred. Restoring an item may include replacing individual components of the item that were damaged during the loss event. When the item is considered to be a total loss, the item may be replaced or compensation may be provided based on the value of the item prior to the loss event (e.g., as determined by the state of the item prior to the loss event).

FIG. 1 illustrates a block diagram of a total loss evaluation and handling system 101 in communication system 100 that may be used according to an illustrative embodiment of the disclosure. The total loss evaluation and handling system 101 may have a processor 103 for controlling overall operation of the total loss evaluation and handling system 101 and its associated components, including RAM 105, ROM 107, input/output module 109, and memory 115.

Input/output module 109 may include a microphone, keypad, touch screen, and/or stylus through which a user of the total loss evaluation and handling system 101 may provide input, and may also include one or more of a speaker for providing audio output and a video display device for providing textual, audiovisual and/or graphical output. Software may be stored within memory 115 to provide instructions to processor 103 for enabling the total loss evaluation and handling system 101 to perform various functions. For example, memory 115 may store software used by the total loss evaluation and handling system 101, such as an operating system 117, application programs 119, and an associated database 121. Processor 103 and its associated components may allow the total loss evaluation and handling system 101 to run a series of computer-readable instructions to, e.g., obtain vehicle information related to the operation and state of the vehicle, apply a total loss ruleset to the vehicle information, determine whether the loss of the vehicle is a total loss, and initiate payment to an individual associated with the vehicle as settlement for the total loss. The processor 103 and computer-readable instructions may also facilitate the exchange of electronic communications between the total loss evaluation and handling system 101 and various devices and systems located remotely relative to the total loss evaluation and handling system.

The total loss evaluation and handling system 101 may operate in a networked environment supporting connections to one or more remote computers, such as terminals 141 and 151. The terminals 141 and 151 may be personal computers or servers that include many or all of the elements described above relative to the total loss evaluation and handling system 101. Also terminal 141 and/or 151 may be sensors such as cameras and other detectors that allow damage related to the vehicle to be assessed. The terminals 141 or 151 may also be mobile and/or portable terminals including various other components, such as a battery, speaker, and antennas (not shown).

The network connections depicted in FIG. 1 include a local area network (LAN) 125 and a wide area network (WAN) 129, but may also include other networks. When used in a LAN networking environment, the total loss evaluation and handling system 101 is connected to the LAN 125 through a network interface or adapter 123. When used in a WAN networking environment, the total loss evaluation and handling system 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

Additionally, one or more application programs 119 used by the total loss evaluation and handling system 101 according to an illustrative embodiment of the disclosure may include computer executable instructions for invoking functionality related to receiving a first notice of loss regarding a vehicle, obtaining vehicle information related to the operation and state of the vehicle, applying a total loss ruleset to the vehicle information, determining whether the loss is a total loss based on application of the total loss ruleset to the vehicle information, obtaining an estimated value of the vehicle, generating and transmitting a valuation report, generating and transmitting a settlement offer to settle the total loss of the vehicle, receiving acceptance or rejection of the settlement offer, initiating payment of the settlement amount, requesting a rental car, requesting tow service, and additional functionality that will be appreciated with the benefit of this disclosure.

The disclosure is operational with special-purpose computing system environments or configurations that enable insurance companies to receive a notice of loss, automatically determine whether the loss is a total loss, and automatically provide payment as settlement for the total loss. Examples of computing systems, environments, and/or configurations that may be employed to implement aspects of the disclosure include, but are not limited to, personal computers, server computers, hand-held or laptop devices, multiprocessor systems, microprocessor-based systems, programmable consumer electronics, network PCs, minicomputers, mainframe computers, and distributed computing environments that include any of the above systems or devices specially configured to carry out aspects of the disclosure.

The disclosure may be described in the context of computer-executable instructions, such as program modules, being executed by a computer. Generally, program modules include routines, programs, objects, components, data structures, etc. that perform particular tasks or implement particular abstract data types. The disclosure may also be practiced in distributed computing environments where tasks are performed by remote processing devices that are linked through a communications network. In a distributed computing environment, program modules may be located in both local and remote computer storage media including non-transitory memory storage devices, such as a hard disk, random access memory (RAM), and read only memory (ROM).

Figure 2:
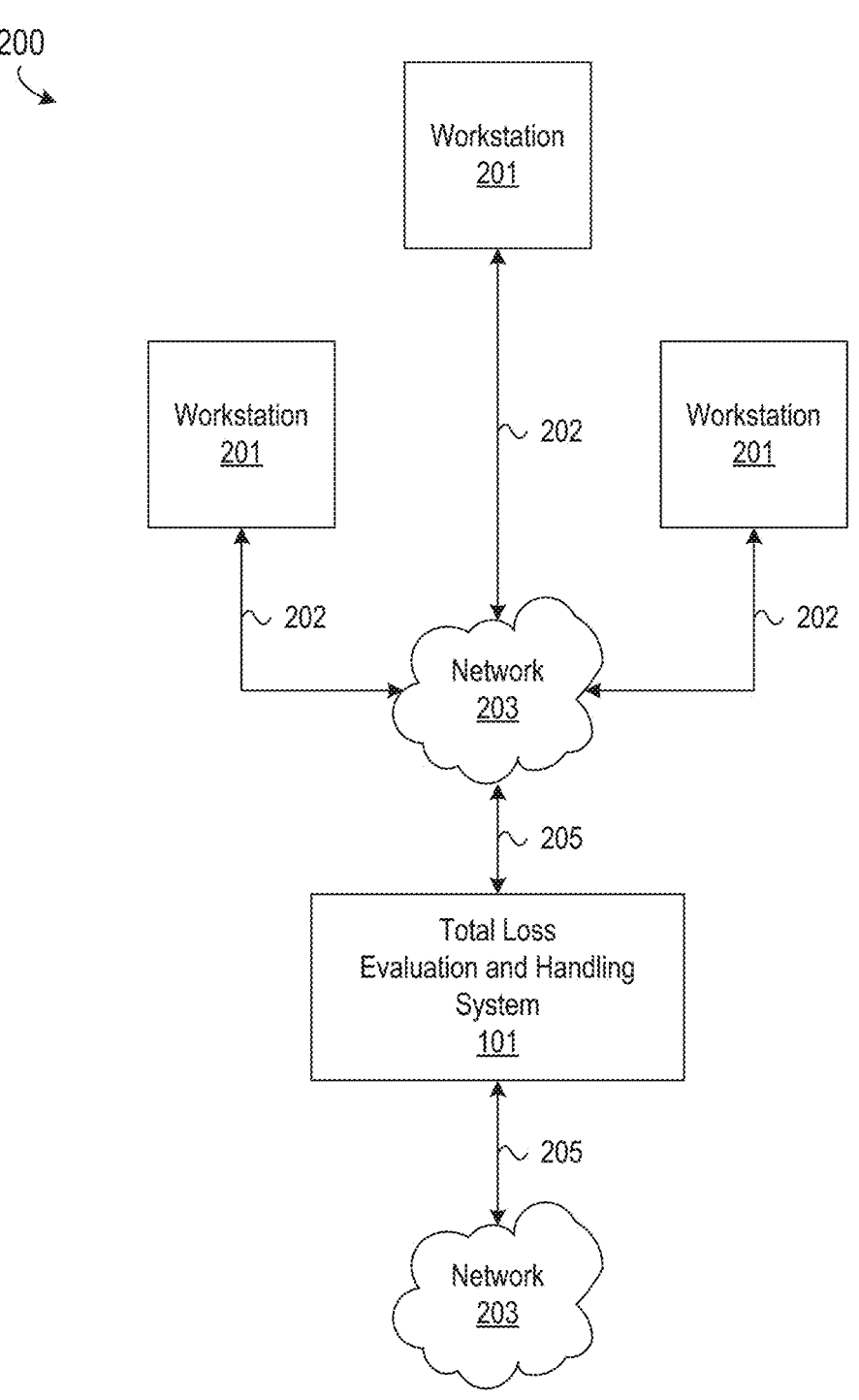
FIG. 2 is a block diagram of workstations and servers that may be used to implement the processes and functions of certain aspects of the present disclosure.

Referring to FIG. 2, a system 200 for implementing methods according to the present disclosure is shown. As illustrated, system 200 may include one or more workstations/servers 201. Workstations 201 may be local or remote, and are connected by one or more communications links 202 to computer network 203 that is linked via communications links 205 to the total loss evaluation and handling system 101. In certain embodiments, workstations 201 may run different algorithms used by the total loss evaluation and handling system 101 for evaluating and handling a total loss, or, in other embodiments, workstations 201 may be different types of sensors that provide information to the total loss evaluation and handling system 101 for evaluating the circumstances of the loss and the damage that has occurred to the vehicle. In system 200, the total loss evaluation and handling system 101 may be any suitable server, processor, computer, or data processing device, or combination of the same specially configured to carry out aspects of the disclosure.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and the total loss evaluation and handling system 101, such as network links, dial-up links, wireless links, hard-wired links, etc.

Figure 3:
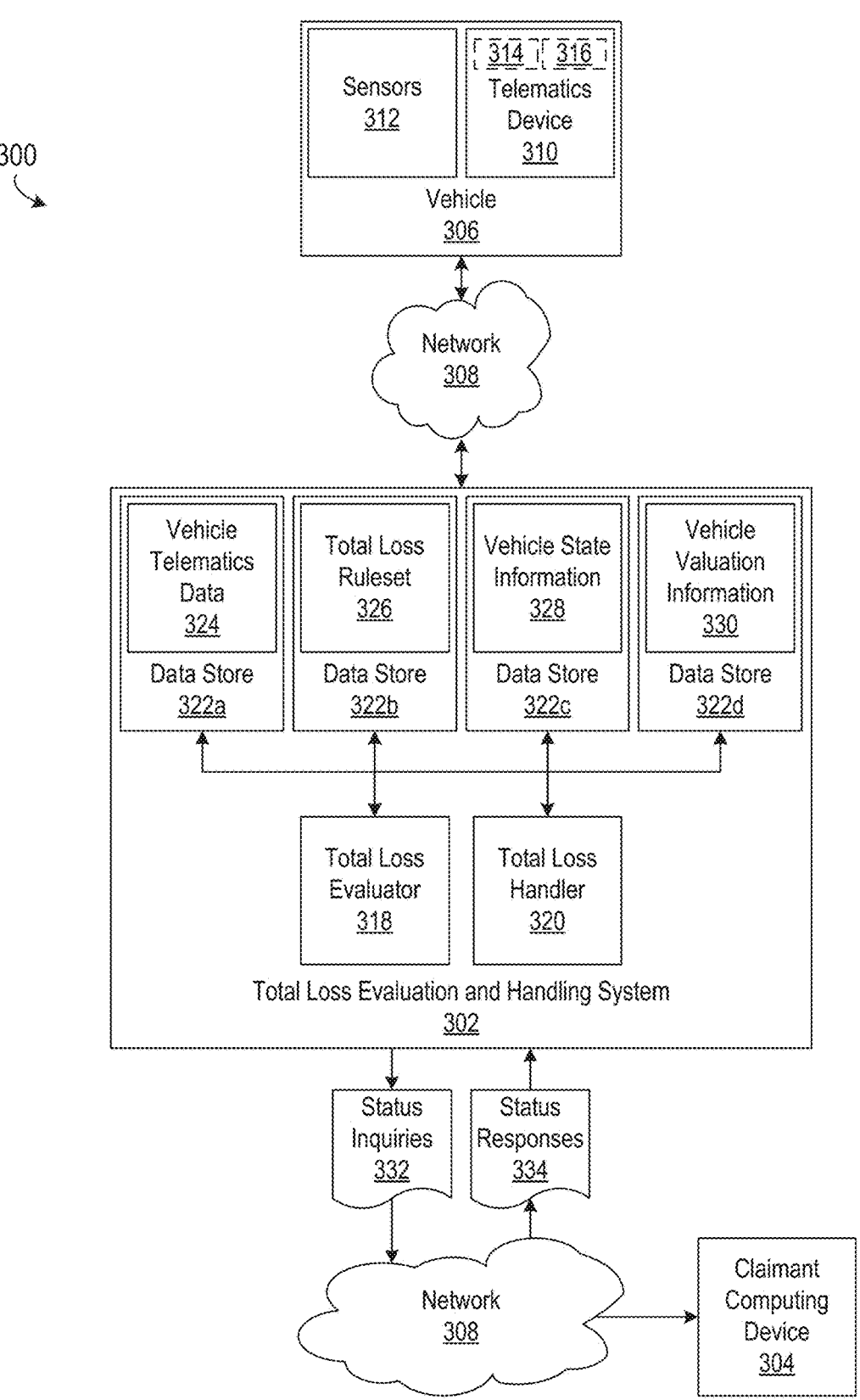
FIG. 3 is a block diagram of an example of a system for total loss evaluation and handling in accordance with various aspects of the present disclosure.

Referring now to FIG. 3, an example of an implementation of a system 300 for total loss evaluation and handling is shown. The system 300, in this example, includes a total loss evaluation and handling system 302 in signal communication with a claimant computing device 304 and a vehicle 306 via respective networks 308. The total loss evaluation and handling system 302 may be the same as or at least similar to the total loss evaluation and handling system 101 described above with reference to FIG. 1 and FIG. 2. As also noted above, the networks 308 may include one or more WANs such as, e.g., the Internet, a cellular network, and combinations of such networks.

The communications between the total loss evaluation and handling system 302 and the claimant computing device 304 may include a notification corresponding to the first notice of loss, a set of questions regarding the state of the vehicle following the loss (e.g., damage that has occurred to the vehicle), an indication that the loss is a total loss of the vehicle, an estimated value of the vehicle, a settlement offer for the total loss, an indication of whether the claimant has accepted or rejected the settlement offer, and other types of information that will be appreciated with the benefit of this disclosure.

The communications between the total loss evaluation and handling system 302 and the vehicle 306 may include vehicle information related to the operation and state of the vehicle as well as its various components. As seen in FIG. 3, the vehicle 306, in this example, includes a telematics device 310 and various sensors 312. The telematics device 310 may be installed at the vehicle 306 or attached to the vehicle, e.g., to an OBD (on-board diagnostics) port. The telematics device 310 may be configured to communicate with the sensors 312 of the vehicle 306 and other vehicle sub-systems to collect data that describes the operation and state of the vehicle and its components. Such data may include, for example, engine RPM, emissions control, coolant temperature, vehicle speed, timing advance, throttle position, and oxygen sensing, the vehicle identification number (VIN), the current odometer value, parameter identifiers (PIDs), timestamp information, and the like. The sensors 312 may provide sensor data indicating the status and conditions of various systems, components, and devices of the vehicle including, for example, the engine, transmission, chassis, body, wheels, tires, and the like. The sensors 312 may also include sensors that can detect state of the panels of the vehicle body, e.g., damage in the form of deformations, dents, punctures, and the like. The sensors 312 may include, for example, temperature sensors, pressure sensors, angular position sensors, linear position sensors, rotational motion sensors, inertial sensors, fluid sensors, and the like. The sensors 312 may also include a positioning sensor that determines the geographic location of the vehicle and generates positioning data during operation of the vehicle such as, e.g., a GPS device. The positioning data generated by the positioning sensor may also include or be used to derive vehicle speed. The telematics device 310 may receive the sensor data from the sensors and include the sensor data in the telematics data transmitted to the total loss evaluation and handling system 302.

The telematics device 310 may include software 314 and hardware 316 such as, e.g., an accelerometer, firmware, a data store, a wireless transmitter, and the like. The telematics device 310 may be configured to collect the telematics data during operation of the vehicle and provide the telematics data to the data store for storage. The telematics device 310 may continuously transmit collected sensor data to the total loss evaluation and handling system 302 at periodic intervals during operation of the vehicle (e.g., every 10-1000 milliseconds) in real-time or near real-time. The wireless transmitter of the telematics device 310 may be, e.g., a GSM modem (Global System for Mobile Communications). The accelerometer of the telematics device 310 may be, e.g., a three-axis (triaxial) accelerometer that measures acceleration along three different axes at a predetermined frequency, e.g., 4 Hertz (Hz). Accordingly the acceleration data may be indicative of right/left acceleration, forward/backward acceleration, and up/down acceleration.

The telematics device 310 may also be configured to analyze the telematics data collected in order to detect collision events involving the vehicle. The telematics data stored by the telematics device 310 may include acceleration data generated by an accelerometer during operation of the vehicle. The telematics device 310 may analyze the acceleration data (e.g., at the software 314 or hardware 316) to determine whether a collision has occurred. The telematics device 310 may determine that a collision has occurred based on an observed change in acceleration, e.g., a rapid acceleration or a rapid deceleration. In some example implementations, the telematics device 310 may determine that a collision has occurred upon observing a change in velocity of around 8.0 kilometers per hour occurs within an interval of around 150 milliseconds, i.e., a change in velocity of around 4.97 miles per hour within an interval of around 0.15 seconds. The telematics device 310 may also determine whether a collision event has occurred based on the vehicle speeds received from the positioning sensor or derived from positioning data received from the positioning sensor. Accordingly the telematics data transmitted to the total loss evaluation and handling system 302 may include an indication that a collision event has been detected as well as details associated with the collision event, e.g., the observed change in velocity.

As described in further detail below, the total loss evaluation and handling system 302 may determine whether a loss is a total loss based, at least in part, on the telematics data associated with a detected collision event. In some example implementations, receipt of telematics data that identifies a collision has occurred may serve as the first notice of loss regarding the vehicle. Commonly-owned U.S. Pat. No. 8,799,034 to Brandmaier et al. entitled "Automated Accident Detection, Fault Attribution, and Claims Processing" (incorporated by reference) describes additional techniques for collecting telematics data during operation of a vehicle and detecting vehicle collision events.

The total loss evaluation and handling system 302, in this example, includes a total loss evaluator 318 and a total loss handler 320 as well as various data stores 322 (collectively) that store the data used to automatically evaluate and handle a total loss. The total loss evaluation and handling system 302, in this example, includes a data store 322a that stores the vehicle telematics data 324 received from the vehicle 306, a data store 322b that stores the total loss ruleset 326 used to automatically determine whether a loss is a total loss, a data store 322c that stores vehicle state information 328 indicating the state of a vehicle and its various components, and a data store 322d that stores vehicle valuation information used to estimate the value of the vehicle and generate a settlement offer for the total loss. Although the total loss evaluation and handling system 302, in this example, includes multiple data stores 322, other implementations of a total loss evaluation and handling system may store the vehicle telematics data 324, total loss ruleset 326, vehicle state information 328, and vehicle valuation information at a single data at fewer data stores, e.g., a single data store. In some implementations, for example, a total loss evaluation and handling system may not store the vehicle telematics data 324 but rather retrieve vehicle telematics data from a separate vehicle telematics collection and storage system that stores the telematics data received from the vehicle 306. In another example implementation, the total loss evaluation and handling system may not store the vehicle valuation information 330 but rather retrieve vehicle valuation information from a separate vehicle valuation system that provides valuation information for vehicles. Other configurations and arrangements of the total loss evaluation and handling system will be appreciated with the benefit of this disclosure and may be selectively employed.

In some example implementations, the total loss evaluation and handling system 302 is a special-purpose computing device programmed with instructions that, when executed, perform functions associated with collecting telematics data associated with an item, determining that a loss associated with the item has occurred, applying a set of total loss rules to determine whether the loss is a total loss, and providing compensation for the total loss. In these example implementations, the total loss evaluator 318 and the total loss handler 320 of the total loss evaluation and handling system 302 correspond to particular sets of instructions embodied as software programs residing at the system.

In other example implementations, the total loss evaluation and handling system 302 is a collection of special-purpose computing devices that are interconnected and in signal communication with each other. In these example implementations, the total loss evaluator 318 and the total loss handler 320 of the total loss evaluation and handling system 302 respectively correspond to a special-purpose computing device programmed with a particular set of instructions that, when executed, perform respective functions associated with collecting telematics data associated with an item, determining that a loss associated with the item has occurred, applying a set of total loss rules to determine whether the loss is a total loss, and providing compensation for the total loss. Such special-purpose computing devices may be, for example, application servers programmed to perform the particular set of functions.

The vehicle telematics data 324 may include the telematics data received from the vehicle 306 as described above. The vehicle state information 328 may include information describing the state of the vehicle and its various components. The vehicle state information 328 may include state information corresponding to or derived from the vehicle telematics data 324 as well as state information received from an individual in response to various inquiries regarding the state of the vehicle. Collecting vehicle state information 328 from an individual associated with the vehicle will be described in further detail below. The vehicle state information 328 may include the state of various vehicle components and sub-systems, e.g., an identification of which vehicle components and sub-systems have been damaged and an indication of the extent of the damage. The vehicle state information 328 may also include identification of the various characteristics of the vehicle, e.g., the make of the vehicle, the model of the vehicle, the year of the vehicle, the current vehicle mileage, the state of vehicle components before and after the loss, and the options the vehicle includes. Examples of vehicle components include, the seats, the tires, the windows, the mirrors, the body panels, and the like. Vehicle options may include, e.g., sunroof, leather seats, cruise control, power windows, power locks, air conditioning, power seats, radio, disc player, navigation system, entertainment system, and other types of vehicle components that may need to be repaired in the event of a collision. The options a vehicle includes may affect the value of the vehicle. Vehicle valuation information 330 may include information used to determine vehicle values, e.g., vehicle makes, vehicle models, vehicle years, vehicle mileage, vehicle options, the condition of interior and exterior vehicle components, and tables of corresponding vehicle values. Vehicle valuation information 330 may also include the salvage value of the vehicle if the vehicle is determined to be a total loss.

The total loss rule set 326 may be a collection of one or more total loss rules that define what combinations of vehicle telematics data 324 and vehicle state information 328 constitute a total loss of a vehicle. A total loss rule may be configured such that the determination of a total loss is based solely on the vehicle telematics data 324, based solely on the vehicle state information 328, or based on a combination of vehicle telematics data and vehicle state information. An analysis of previously collected vehicle telematics data and vehicle state information may reveal thresholds and combinations of vehicle telematics information and vehicle state information that are highly correlative with determinations of total losses. The correlations between these thresholds and combinations of vehicle telematics data and vehicle state information may be leveraged to configure the total loss rules. In operation, a loss may be determined to be a total loss when the vehicle telematics data or vehicle state information received matches the vehicle telematics data or vehicle state information defined in the total loss rule.

As one example, an analysis of previously collected vehicle telematics data and previous total loss determinations may reveal that x % of losses (e.g., 90% of losses) are total losses where a vehicle experienced a deceleration of more than y meters/second$^2$ (m/s$^2$) during a vehicle collision. Accordingly, the total loss ruleset 326 may include a total loss rule configured such that a loss is determined to be a total loss in response to receipt of vehicle telematics data 324 indicating the vehicle 306 experienced a deceleration that exceeded a predetermined deceleration threshold, e.g., more than y m/s$^2$. An example of a deceleration threshold at which a total loss is determined is a decoration of 147 m/s$^2$. In some example implementations, a total loss may automatically be determined to have occurred where the telematics data that indicates a deceleration at or above this threshold occurred. In other example implementations, deceleration at or above the deceleration threshold may be one of many factors used to determine that a total loss occurred. Additional factors that may indicate a total loss occurred when considered in combination with each other include the number of damaged body panels, airbag deployment, leaking fluids, and the like. Some of the information corresponding to these total loss factors may be gathered via the telematics data, and other information corresponding to these total loss factors may be gathered via a loss report provided via an online interface or via a voice interaction. As noted above, the state of the vehicle prior to the loss (i.e., the condition of the vehicle) affects the value of the vehicle and thus the determination of whether the damage that occurred to the vehicle renders the vehicle a total loss. Factors affecting the value of the vehicle and thus the determination of whether the vehicle is unrepairable include the make, model, mileage, options, the degree of damage to the undercarriage or drivetrain, maintenance, and other conditions of the vehicle. Maintenance information may be received from third-party maintenance systems in signal communication with the total loss evaluation and handling system 302. Information for these factors may be gathered via different channels such as through the collection of telematics data, conversations with the owner of the vehicle, or through physical inspection of the vehicle.

The total loss rules of the total loss ruleset 326 may also include total loss rules similarly configured to determine that a loss is a total loss in response to receipt of vehicle telematics data indicating a vehicle experienced an acceleration of more than y m/s$^2$, e.g., due to an impact. Some of the total loss rules based on a detected impact at the vehicle 306 may additionally be configured to determine whether a loss is a total loss based on where the impact occurs, e.g., a side impact of the vehicle. The vehicle telematics data 324 received from the vehicle 306 may include data that identifies the location at the vehicle where the impact occurred. Total loss rules of the total loss ruleset 326 may include additional criteria for automatically determining whether a loss is a total loss such as, for example, the impact force. Accordingly, the total loss ruleset 326 may include a total loss rule configured such that a loss is a total loss in response to receipt of vehicle telematics data 324 indicating the vehicle 306 experienced a front, rear, or side impact force that exceeded a predetermined impact force threshold, e.g., more than z Newtons (N) of impact force. The total loss rules may also be configured to determine whether a loss is a total loss based on the angle of the impact, e.g., head-on or at an oblique angle. As noted above, an analysis of previously collected vehicle telematics data and previous total loss determinations may reveal that x % of losses are total losses where the vehicle experienced an acceleration of y m/s$^2$ or, additionally or alternatively, the vehicle experienced an impact of z N at a particular location. As noted above, an example deceleration threshold that may be utilized, alone or in combination with other factors, to determine that a total loss has occurred may be a deceleration rate of 147 m/s$^2$.

As another example, an analysis of previously collected vehicle telematics data and previous total loss determinations may reveal that x % of losses are total losses where a vehicle experienced at least y number of rollovers (e.g., at least 2 rollovers) during a vehicle collision. Accordingly, the total loss ruleset 326 may also include a total loss rule configured such that a loss is determined to be a total loss in response to receipt of vehicle telematics data 324 indicating the vehicle 306 experienced at least y number of rollovers. Similarly, an analysis of previously collected telematics data are previous total loss determinations may reveal that x % of losses are total losses where a vehicle experienced freefall for more than y seconds (e.g., more than 5 seconds). Accordingly, the total loss ruleset 326 may include a total loss rule configured such that a loss is determined to be a total loss in response to receipt of vehicle telematics data 324 indicating the vehicle 306 experienced freefall for more than y seconds.

As a further example, an analysis of previously collected vehicle state data and previous total loss determinations may reveal that x % of losses are total losses where vehicle state data indicates the combination of vehicle component A, vehicle component B, and vehicle component C have been damaged. The components may be internal to the vehicle (e.g., vehicle sub-systems) or external to the vehicle (e.g., vehicle panels, windows, and the like). Accordingly, the total loss rule set 326 may also include a total loss rule configured such that a loss is determined to be a total loss in response to receipt of vehicle state information 328 indicating that at least vehicle component A, vehicle component B, and vehicle component C have been damaged.

Total loss rules of the total loss ruleset 326 may also be configured to determine whether a loss is a total loss based on combinations of vehicle telematics data 324 and vehicle damage information 328. As an example, a total loss rule of the total loss ruleset 326 may be configured to determine a loss is a total loss in response to receipt of vehicle telematics data 324 indicating the vehicle 306 experienced a deceleration of more than y m/s$^2$ and receipt of vehicle state information 328 indicating that vehicle component A, vehicle component B, and vehicle component C have been damaged.

Some of the total loss rules of the total loss ruleset 326 may be configured such that they are applied regardless of vehicle type. For example, total loss rules that determine whether a loss is a total loss based on a deceleration threshold may be applicable to all types of vehicles. Other total loss rules of the total loss ruleset 326 may only be applicable to a defined vehicle make, a defined vehicle model, a defined vehicle year, and combinations of the vehicle make, model, and year. Accordingly, the total loss rules selected and applied to the loss, may include total loss rules applicable to all vehicles as well as total loss rules applicable to the particular make, model, and year of the vehicle associated with the loss.

As noted above, some total loss rules of the total loss ruleset 326 may determine whether a loss is a total loss based solely on vehicle telematics data 324 received from the vehicle while other total loss rules may determine whether a loss is a total loss based, at least in part, on vehicle state information 328 received from an individual associated with the vehicle. Accordingly, some of the total loss rules may be immediately applied in response to receipt of vehicle telematics data 324 that includes a notification that a collision has occurred. Other total loss rules may be applied once the individual associated with the loss has finished providing the vehicle state information 328 indicating the damage caused to the vehicle 306. In some implementations, the collection of vehicle state information 328 may be omitted if the loss is determined to be a total loss based solely on the vehicle telematics data 324 received.

The total loss evaluator 318 may be configured to determine whether the loss is a total loss by applying total loss rules from the total loss ruleset 326. The total loss evaluator 318 may initiate the total loss determination procedure in response to receipt of a first notice of loss. As noted above, the first notice of loss (FNOL) may be received in vehicle telematics data 306 from the vehicle or from an individual associated with the vehicle, e.g., the vehicle owner or the driver. The individual may provide the first notice of loss via the claimant computing device 304, e.g., using a web browser to access a web interface provided by the total loss evaluation and handling system 302 or using a mobile application to access a mobile interface provided by the total loss evaluation and handling system. The FNOL may include information identifying the vehicle make, model, and year or information that may be used to lookup the vehicle make, model, and year (e.g., a unique identifier such as the VIN, license plate number, an insurance customer number, an insurance policy number, and the like). The total loss evaluator 318 may also be configured to select the total loss rules from the total loss ruleset 326 to apply. As noted above, the total loss evaluator 318 may select total loss rules applicable to all types of vehicles as well as the total loss rules applicable to the vehicle make, model, and year identified.

The total loss evaluator 318 may retrieve vehicle telematics data 324 from the data store 322a and vehicle state information 328 from the data store 322c when applying the total loss rules. The total loss evaluator 318 may determine whether a loss is a total loss when the vehicle telematics data 324 or vehicle state information 328 satisfies the criteria defined in at least one of the total loss rules applied. In some example implementations, the total loss evaluator 318 may determine that a loss is a total loss when the vehicle telematics data 324 or vehicle state information 328 satisfies the criteria respectively defined in multiple total loss rules. The total loss evaluator 318 may be configured to generate an indication of whether the loss is determined to be a total loss (e.g., YES/NO). The total loss evaluator 318 may be configured to initiate standard processing of an insurance claim if the loss is not determined to be a total loss. If the total loss evaluator 318 determines that the loss is a total loss, then the total loss evaluator may initiate valuation of the vehicle and compensation for the total loss as described in further detail below.

The total loss handler 320 may be configured to collect vehicle state information 328 in response to receipt of a first notice of loss and may be configured to carry out vehicle valuation and compensation if the loss is determined to be a total loss. As noted above, vehicle state information 328 indicating the damage to the vehicle may be received from the individual associated with the vehicle. The total loss handler 320 may facilitate the collection of vehicle state information 328 from the individual through a set of status inquiries 332 provided to the claimant computing device 304. The set of status inquiries 332 may be presented to the individual at the claimant computing device 304, e.g., in a webpage at a web browser or at an interface screen of a mobile application. In response to the set of inquiries 332, the total loss handler 320 may receive a set of status responses 334 from the individual. The total loss handler 320 may forward the set of status responses 334 to the data store 322c for storage as vehicle state information 328.

The set of status inquiries 332 may include standard inquiries for each notice of loss received and may, additionally or alternatively, include inquiries that are based on vehicle telematics data 324. As an example, the vehicle telematics data 324 received from the vehicle 306 may identify various vehicle components that are damaged. The total loss handler 320 may thus select status inquiries related to those vehicle components such that the individual may confirm the damage to those components or provide additional information regarding the damage to those components. The set of status inquiries 332 may also include inquiries regarding the circumstances of the loss, e.g., vehicle speed at the time of a collision, traffic conditions, weather conditions, and the like. The set of status inquiries 332 may include possible answers the individual may select to identify the status of the vehicle and its components, e.g., on a scale of 1-5 or descriptors such as "excellent," "good," "fair," and "poor." The set of status inquiries 332 may also include images depicting damage to a vehicle of the same make, model, and year. The images may depict increasing degrees of damage to areas of the vehicle or components of the vehicle that have been identified as damaged, e.g., from the vehicle telematics data 324 received from the vehicle 306 or from vehicle state information 328 received from the individual. For example, the images may depict increasing degrees of deformations to the vehicle body and the individual may select the image that best depicts the deformations of the vehicle 306. As another example, the images may depict increasing degrees of wear to the fabric of the interior components of a vehicle, and the individual may select the image that best depicts the damage to the fabric of the interior of the vehicle 306. The individual may submit the selected image as part of the set of status responses 334. The total loss evaluator 318 may determine whether a loss is a total loss based, at least in part, on the images selected by the user as best depicting the damage to the vehicle 306.

The status inquiries 332 provided to the individual may include both initial status inquiries and follow-up status inquiries. The total loss handler 320 may be configured to select follow-up status inquiries based on initial status responses received from the individual. The follow-up status inquiries may request that the individual address any inconsistencies detected during a comparison of the initial status responses to, e.g., the vehicle telematics data 324 received. As an example, the total loss handler 320 may request, in a follow-up status inquiry, that the user inspect a particular vehicle component the vehicle telematics data 324 identifies as damaged but was omitted in the initial status responses received from the individual. As another example, the total loss handler 320 may request, in a follow-up status inquiry, confirmation of vehicle speed where the speed indicated by the user significantly differs from the speed indicated in the vehicle telematics data 324. In some implementations, the total loss handler may base the status responses available for selection on the telematics data 324 received. For example, if the vehicle telematics data 324 indicates the vehicle speed was about 55 mile per hour (mph) when the vehicle collision occurred, the total loss handler 320 may include "about 35 mph," "about 45 mph," "about 55 mph," and "about 65 mph" as possible status responses to a status inquiry related to vehicle speed.

Figure 4:
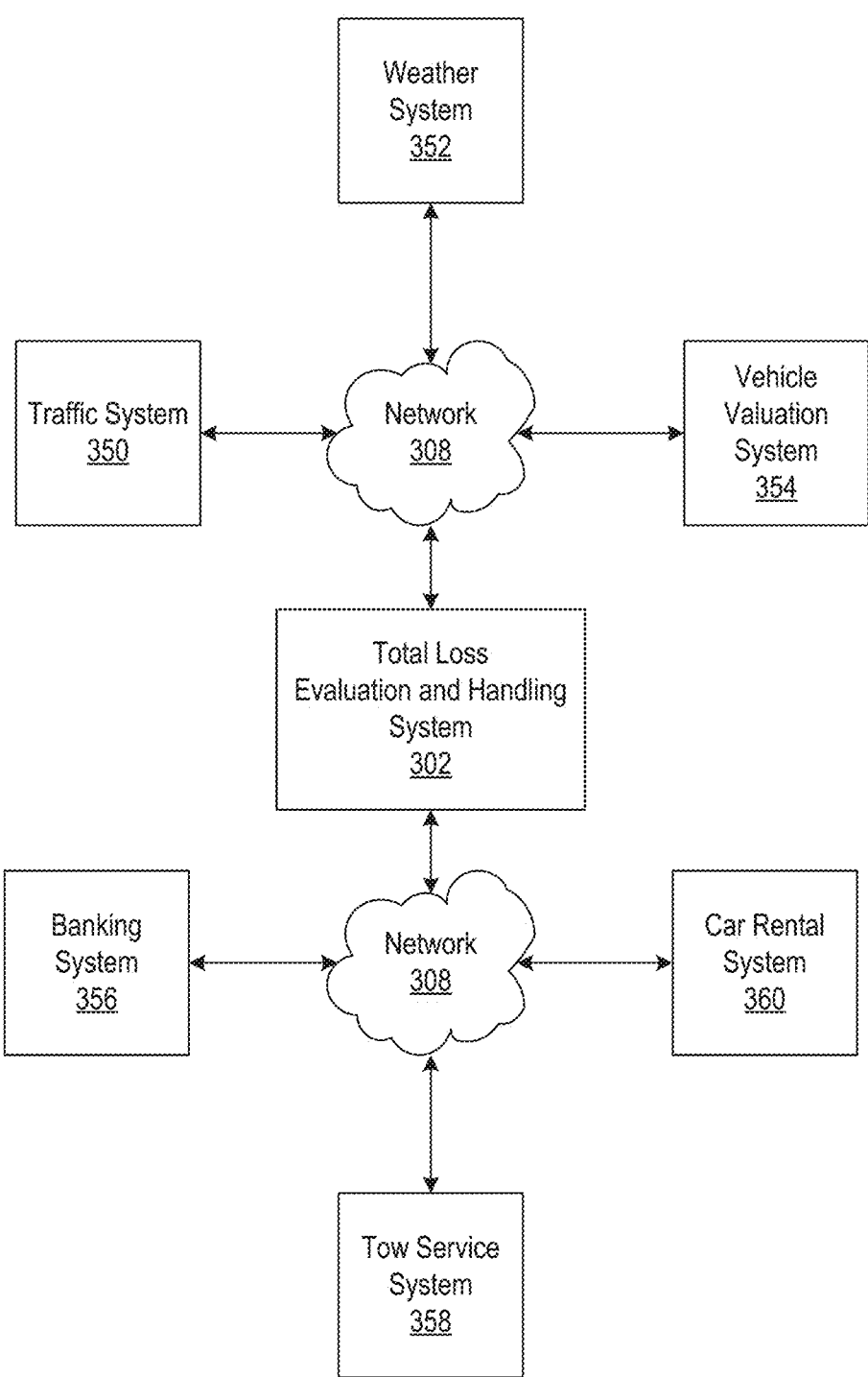
FIG. 4 is another block diagram of the total loss evaluation and handling system of FIG. 3 in accordance with additional aspects of the present disclosure.

The total loss handler 320 may also receive information from remotely located sources that is compared against the status responses 334 received from the individual. With additional reference to FIG. 4, the total loss evaluation and handling system 302 is in signal communication with various systems that are located remotely relative to the total loss evaluation and handling system. The total loss evaluation and handling system 302 may exchange electronic communications with these systems via a network 308, e.g., the Internet. Accordingly the electronic communications may include HTTP requests and HTTP responses. As seen in FIG. 4, the remote systems may include a traffic system 350, a weather system 352, a vehicle valuation system 354, a banking system 356, a tow service system 358, and a car rental system 360.

The total loss handler 320 of the total loss evaluation and handling system 302 may submit requests for traffic information to the traffic system 350. The request may indicate the geographic area in which the loss occurred and a time around which the loss occurred, e.g., as indicated by vehicle telematics data collected or vehicle state information received. The traffic information received from the traffic system 350 may indicate the volume of traffic at the identified time and location (e.g., none, light, medium, heavy, etc.). The total loss handler 320 may compare the traffic information received from the traffic system 350 to traffic information received from the individual regarding the volume of traffic when the loss occurred. Similarly the total loss handler 320 may submit requests for weather information to the weather system 352. The request may likewise indicate the geographic area in which the loss occurred and the time around which the loss occurred. The weather information received from the weather system 352 may indicate the weather states at the identified time and location (e.g., clear, raining, snowing, icy, etc.). The total loss handler 320 may also compare the weather information received from the weather system 352 to weather information received from the individual regarding the weather conditions when the loss occurred.

In some example implementations, the total loss handler 320 may be configured to reject automatic compensation for a loss if there are too many discrepancies between the vehicle telematics data 324 collected from the vehicle 306 and the vehicle state information 328 received from the individual in status responses 334 or if the individual cannot resolve such discrepancies with follow-up status responses. By comparing the information received from an individual in the set of status responses 334 to information collected from other sources such as the vehicle telematics device 310 and third-party remote systems 350 and 352, the individual is advantageously encouraged to be accurate in responding to the set of status inquiries 332.

The total loss handler 320 may also be configured to determine the value of the vehicle. The total loss handler 320 may determine the value of the vehicle based on vehicle valuation information 330 stored at the data store 322d of the total loss evaluation and handling system 302 and, additionally or alternatively, based on vehicle valuation information received from a third-party vehicle valuation system such as vehicle valuation system 354. As noted above, valuation of the vehicle may be based on the make, model, year, mileage, and vehicle options. The total loss handler 320 may be configured to generate a valuation report indicating how the vehicle value was determined and transmit the vehicle valuation report to the claimant computing device 304 for review by the individual associated with the vehicle. The individual may have the opportunity to accept or object to the vehicle value indicated in the vehicle valuation report. The individual may also have the opportunity to submit additional information regarding the vehicle that was not considered in the initial vehicle valuation. For example the initial valuation may not have included one or more vehicle options resulting in a relatively lower vehicle value. The individual may identify the additional vehicle options the vehicle includes, and the total loss handler 320 may recalculate the vehicle value based on those additional vehicle options and generate a new valuation report.

The total loss handler 320 may also be configured to generate a settlement offer based on the value of the vehicle and provide the settlement offer to the individual as compensation for the total loss. The total loss handler 320 may transmit the settlement offer to the claimant computing device 304 for consideration by the individual. If the individual does not accept the settlement offer as compensation for the total loss of the vehicle, then an insurance company may handle the loss through typical claims processing with a claims adjuster. If the individual does accept the settlement offer as compensation for the total loss, then the total loss handler 320 may automatically initiate a payment to the individual in the amount of the settlement offer. The total loss handler 320 may for example, submit a request to the banking system 356 to transfer the settlement amount from a bank account associated with an insurance company to a bank account associated with the individual. Settlement for the total loss may also be in the form of a credit for goods or services such as insurance services.

The value of the settlement offer may be at least equal to the accepted vehicle value. In some example implementations, the total loss handler 320 may increase the settlement value when the individual agrees to accept credit for future insurance products rather than a cash payment. For example, the settlement value may be x % above (e.g., 10% above) the accepted vehicle value when the settlement is credit for future insurance products. An insurance policy may also include terms allowing an insurance company to automatically determine whether a loss is a total loss, automatically calculate the value of the vehicle, and automatically provide payment as settlement for the total loss without input or feedback from the insurance customer. To incentivize insurance customers to accept these terms, the insurance policy may also include terms indicating that the payment provided as settlement for the total loss may be x % above the calculated vehicle value. By automating total loss determinations, vehicle valuation, and settlement payments, the total loss evaluation and handling system advantageously streamlines handling notices of loss that are highly likely to be total losses. As a result, more resources may be advantageously available to process other types insurance claims where the assessment of claims adjusters may be necessary.

The total loss handler 320 of the total loss evaluation and handling system 302 may also facilitate other aspects of handling a total loss of a vehicle. Since a vehicle may be undriveable after a total loss, the total loss handler 320 may be configured to handle obtaining a car rental for the driver and a tow service to retrieve the vehicle. The total loss handler 320 may, for example, submit a car rental request to the car rental system 360. The car rental request may indicate the identity and location of the vehicle driver, which the total loss handler 320 may obtain from the vehicle telematics data 324 received. In response to receipt of the car rental request at the car rental system 360, a car rental service may deliver a rental car to the location of the driver. Similarly the total loss handler 320 may submit a tow service request to the tow service system 358. The tow service request may indicate the location of the vehicle as well as the make, model, color, license plate, VIN, and so forth. In response to receipt of the tow service request at the tow service system 358, a tow service may dispatch a tow truck to retrieve the damaged vehicle.

Figure 5:
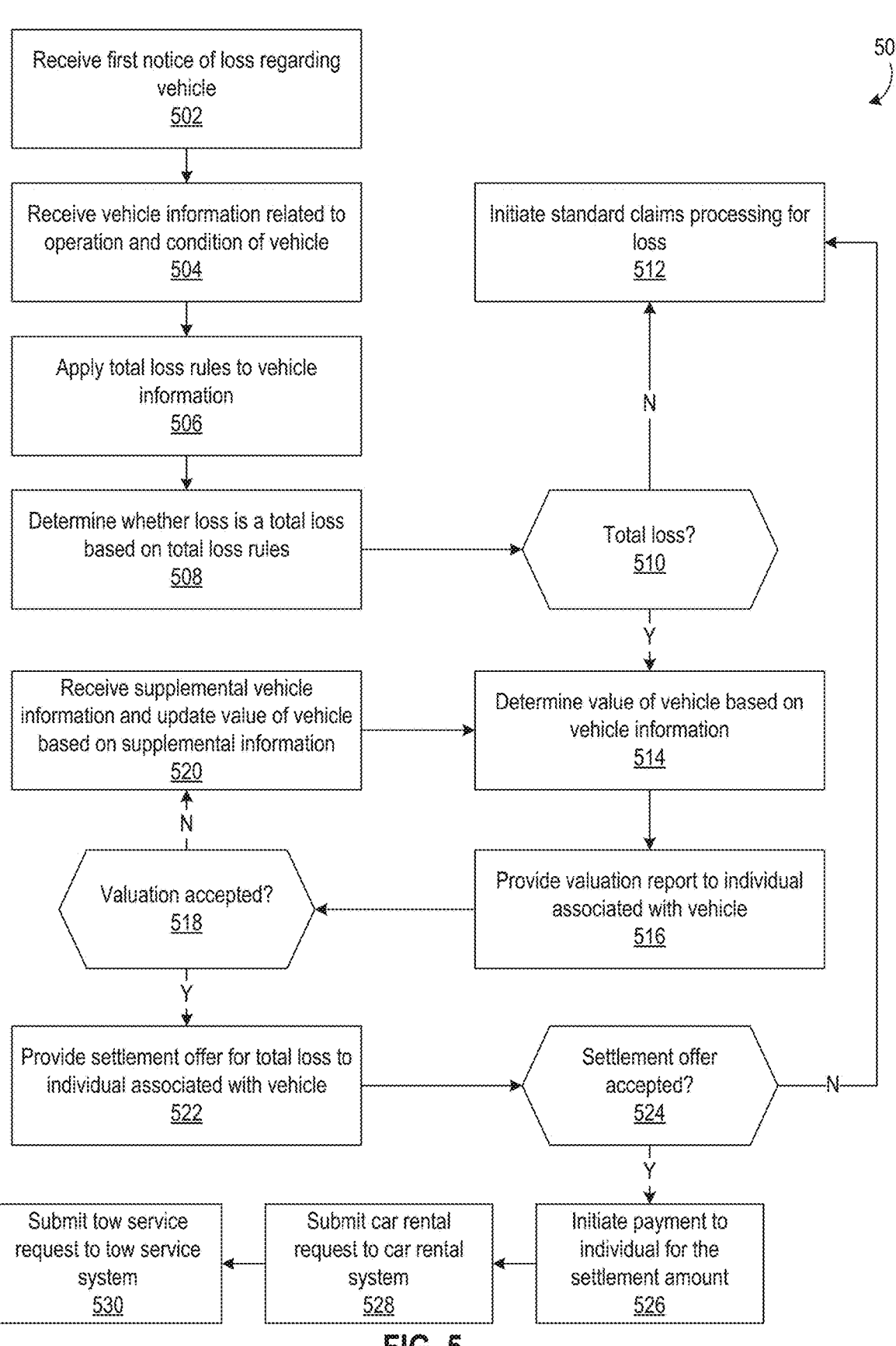
FIG. 5 is a flowchart of example method steps for evaluating and handling a total loss in accordance with various aspects of the present disclosure.

Referring now to FIG. 5, a flowchart of example method steps for evaluating and handling a loss in accordance with aspects of the present disclosure is shown. A total loss evaluation and handling system may perform these example steps to automatically determine that a loss is a total loss, calculate a vehicle value, and initiate a payment as settlement for the total loss based, at least in part, on input or feedback from an individual associated with the vehicle.

An total loss evaluation and handling system may receive a first notice of loss (block 502) as well as vehicle information related to the operation and state of the vehicle (block 504), e.g., vehicle telematics data and vehicle state data as described above. The total loss evaluation and handling system may apply one or more total loss rules to the vehicle information (block 506) and determine whether the loss is a total loss based on the total loss rules (block 508). If the total loss evaluation and handling system does not determine the loss is a total loss (block 510:N), then a standard claims processing procedure may be initiated to handle the loss (block 512).

If, however, the total loss evaluation and handling system determines the loss is a total loss (block 510:Y), then the total loss evaluation and handling system may determine the value of the vehicle based on the vehicle information received (block 514) and provide a valuation report to an individual associated with the vehicle (block 516). If the individual does not accept the valuation of the vehicle (block 518:N), then the total loss evaluation and handling system may receive supplemental vehicle information and update the valuation of the vehicle based on the supplemental information received (block 520) and provide an update valuation report to the individual. When the individual accepts the vehicle valuation (block 518:Y), the total loss evaluation and handling system may generate and provide a settlement offer to the individual associated with the vehicle (block 522). If the individual does not accept the settlement offer (block 524:N), then a standard claims processing procedure may be initiated to handle the loss (block 512).

If, however, the individual does accept the settlement offer (block 524:Y), then the total loss evaluation and handling system may initiate a payment to the individual for the settlement amount (block 526), e.g., by submitting a payment request to a banking system at which the individual maintains a bank account. The total loss evaluation and handling system may also submit a car rental request to a car rental system (block 528) and submit a tow service request to a tow service system (block 530) as also described above.

Figure 6:
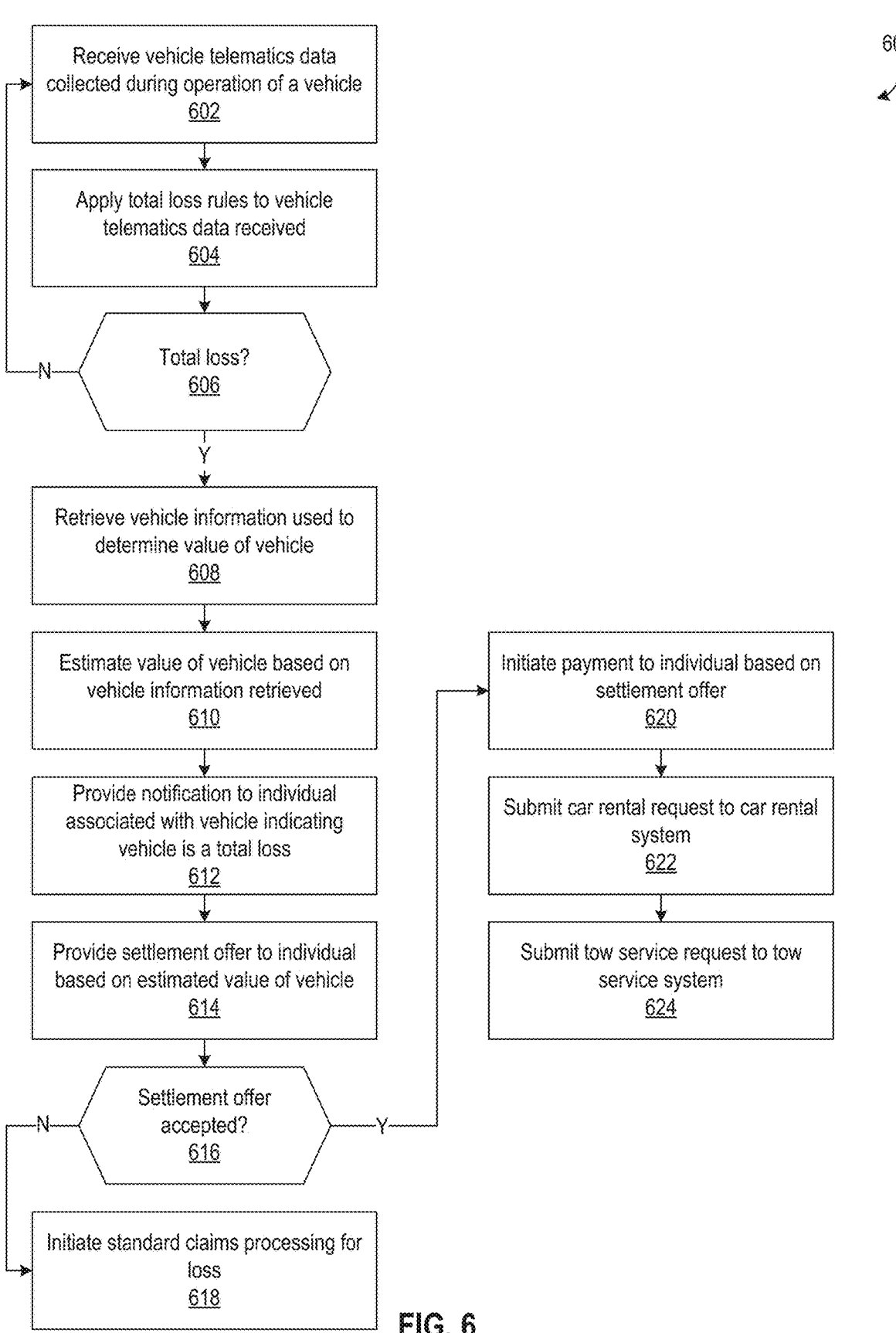
FIG. 6 is another flowchart of example method steps for evaluating and handling a total loss in accordance with various aspects of the present disclosure.

In FIG. 6, another flowchart of example method steps for evaluating and handling a total loss in accordance with various aspect of the present disclosure is shown. A total loss evaluation and handling system may perform these example steps to determine that a loss is a total loss, calculate a vehicle value, and initiate a payment as settlement for the total loss without input or feedback from an individual associated with the vehicle.

A total loss evaluation and handling system may receive vehicle telematics data collected during operation of a vehicle (block 602). The total loss evaluation and handling system may apply one or more total loss rules to the vehicle telematics data received (block 604) as described above to detect a loss and determine whether the loss is a total loss. If the total loss evaluation and handling system does not determine that the loss is a total loss (block 606:N), the total loss evaluation system may continue to receive and process vehicle telematics data. When the total loss evaluation and handling system does determine that a total loss has occurred (block 606:Y), the total loss evaluation and handling system may retrieve vehicle information used to determine the value of the vehicle (block 608) and estimate the value of the vehicle based on the information retrieved (block 610) as described above.

The total loss evaluation and handling system may then provide a notification to an individual associated with the vehicle indicating that the loss is a total loss (block 612) as well as a settlement offer based on the value of the vehicle that has been determined (block 614). If the individual does not accept the settlement offer (block 616:N), then a standard claims processing procedure may be initiated to handle the loss (block 618). If, however, the individual does accept the settlement offer (block 616:Y), then the total loss evaluation and handling system may initiate a payment to the individual for the settlement amount (block 620), e.g., by submitting a payment request to a banking system at which the individual maintains a bank account. The total loss evaluation and handling system may also submit a car rental request to a car rental system (block 622) and submit a tow service request to a tow service system (block 624) as also described above.

Aspects of the disclosure have been described in terms of illustrative embodiments thereof. Numerous other embodiments, modifications, and variations will occur to persons of ordinary skill in the art from a review of this disclosure. For example, one of ordinary skill in the art will appreciate that the steps discussed herein may be performed in other than the recited order, and that one or more steps may be optional in accordance with aspects of the disclosure.

What is claimed is:

1. A method of detecting and processing a loss involving an insured vehicle comprising:

receiving, by a total loss evaluation and handling system, a first notice of loss (FNOL) indication from a claimant computing device;

establishing, by the total loss evaluation and handling system, a wireless data connection with a device present in the insured vehicle, wherein the device comprises one or more sensors configured to sense vehicle acceleration characteristics;

after receiving the FNOL indication, iteratively, and until sufficient vehicle state data is received:

receiving, by the total loss evaluation and handling system via the wireless data connection, vehicle state data corresponding to one or more components of the insured vehicle, wherein at least some of the vehicle state data comprises real-time sensor data captured by the one or more of the sensors indicating a deceleration force experienced by the insured vehicle during a loss event;

applying, by the total loss evaluation and handling system, a total loss rule of a set of total loss rules to at least a portion of the received vehicle state data, wherein a particular total loss rule configures the total loss evaluation and handling system to automatically determine that the loss is a total loss when the deceleration force exceeds a predetermined deceleration threshold;

after receiving sufficient vehicle state data and based on determining that the deceleration force exceeds the predetermined deceleration threshold, determining, by the total loss evaluation and handling system, that the loss is a total loss;

generating, by the total loss evaluation and handling system and based on determining that the loss is a total loss, a settlement amount; and automatically initiating payment of the settlement amount to a bank account associated with an individual associated with the insured vehicle.

2. The method of claim 1, wherein the vehicle state data comprises information describing the state of the insured vehicle and the insured vehicle's components and subsystems.

3. The method of claim 2, wherein the information describing the state of the insured vehicle comprises an identification of which of the insured vehicle's components and sub-systems have been damaged and an indication of an extent of the damage.

4. The method of claim 1, wherein the vehicle state data is received from an individual associated with the insured vehicle.

5. The method of claim 1, wherein the vehicle state data comprises information derived from vehicle telematics data.

6. The method of claim 1, wherein the one or more components of the insured vehicle comprises at least one of seats, tires, windows, air conditioning, navigation system, and entertainment system.

7. The method of claim 1, wherein the vehicle state data comprises information related to at least one of a make of the insured vehicle, a model of the insured vehicle, a year of the insured vehicle, a current vehicle mileage, a state of vehicle components before and after the loss, and options the insured vehicle includes.

8. The method of claim 1, wherein the vehicle state data comprises information corresponding to damage of a first component, a second component, and a third component, each of the one or more components of the insured vehicle.

9. The method of claim 1, further comprising:

receiving, by the total loss evaluation and handling system, prior vehicle state information corresponding to percentage of total loss of vehicles substantially similar to the insured vehicle;

analyzing, by the total loss evaluation and handling system, the prior vehicle state information; and determining, by the total loss evaluation and handling system, the predetermined deceleration threshold corresponding to the vehicle state data.

10. The method of claim 1, further comprising:

establishing, by the total loss evaluation and handling system, a wireless data connection with one or more weather systems;

receiving, by the total loss evaluation and handling system while the wireless data connection is established and from the one more weather systems, weather information corresponding to a geographic location of where the loss occurred; and applying, by the total loss evaluation and handling system, a second total loss rule of the set of total loss rules to a portion of the weather information received.

11. A total loss evaluation and handling system comprising:

at least one processor;

a vehicle state data store; and a total loss evaluator configured to:

receive a first notice of loss (FNOL) indication from a claimant computing device;

establish, by the total loss evaluation and handling system, a wireless data connection with a device present in an insured vehicle, wherein the device comprises one or more sensors configured to sense vehicle acceleration characteristics;

after receiving the FNOL indication, iteratively, and until sufficient vehicle state data is received:

receive, via the wireless data connection, vehicle state data corresponding to one or more components of an insured vehicle, wherein at least some of the vehicle state data comprises real-time sensor data captured by the one or more of the sensors indicating a deceleration force experienced by the insured vehicle during a loss event;

apply a first total loss rule of a set of total loss rules to a portion of the received vehicle state data, wherein a particular total loss rule configures the total loss evaluation and handling system to automatically determine that the loss is a total loss when the deceleration force exceeds a predetermined deceleration threshold;

after receiving sufficient vehicle state data and based on determining that the deceleration force exceeds the predetermined deceleration threshold, determine that the loss is a total loss; and generate based on determining that the loss is a total loss, a settlement amount; and automatically initiate payment of the settlement amount to a bank account associated with an individual associated with the insured vehicle.

12. The total loss evaluation and handling system of claim 11, wherein the total loss evaluator is further configured to:

receive, by the total loss evaluator, prior vehicle state information corresponding to percentage of total loss of vehicles substantially similar to the vehicle;

analyze, total loss evaluator, the prior vehicle state information; and determine, total loss evaluator, the predetermined deceleration threshold corresponding to the vehicle state data.

13. The total loss evaluation and handling system of claim 11, wherein the total loss evaluator is further configured to:

establish, by total loss evaluator, a wireless data connection with one or more weather systems;

receive, by the total loss evaluator while the wireless data connection is established and from the one more weather systems, weather information corresponding to a geographic location of where the loss occurred; and apply, by the total loss evaluator, a second total loss rule of the set of total loss rules to a portion of the weather information received.

14. The total loss evaluation and handling system of claim 11, wherein the vehicle state data comprises information related to at least one of a make of the insured vehicle, a model of the insured vehicle, a year of the insured vehicle, a current vehicle mileage, a state of vehicle components before and after the loss, and options the insured vehicle includes.

15. The total loss evaluation and handling system of claim 11, wherein the one or more components of the insured vehicle comprises at least one of seats, tires, windows, air conditioning, navigation system, and entertainment system.

16. The total loss evaluation and handling system of claim 11, wherein the vehicle state data comprises information received from an individual associated with the insured vehicle or information derived from vehicle telematics data.

17. The total loss evaluation and handling system of claim 11, wherein the first total loss rule is configured to determine whether the loss is a total loss based on an angle of impact experienced by the insured vehicle.

18. A total loss evaluation and handling apparatus comprising:

one or more processors; and a memory storing computer-executable instructions, which, when executed by the one or more processors, cause the one or more processors to:

receive a first notice of loss (FNOL) indication from a claimant computing device a first notice of loss (FNOL) indication;

establish, by the total loss evaluation and handling system, a wireless data connection with a device present in an insured vehicle, wherein the device comprises one or more sensors configured to sense vehicle acceleration characteristics;

after receiving the FNOL indication, iteratively, and until sufficient vehicle state information is received:

receive, via the wireless data connection, vehicle state information corresponding to one or more components of an insured vehicle, wherein at least some of the vehicle state data comprises real-time sensor data captured by the one or more of the sensors indicating a deceleration force experienced by the insured vehicle during a loss event;

apply a first total loss rule of a set of total loss rules to a portion of the received vehicle state data, wherein a particular total loss rule configures the total loss evaluation and handling system to automatically determine that the loss is a total loss when the deceleration force exceed a predetermined deceleration threshold;

after receiving sufficient vehicle state data and based on determining that the deceleration force exceeds the predetermined deceleration threshold, determine that the loss is a total loss;

generate, based on determining that the loss is a total loss, a settlement amount; and automatically initiate payment of the settlement amount to a bank account associated with an individual associated with the insured vehicle.

19. The total loss evaluation and handling apparatus of claim 18, wherein the one or more processors are further caused to:

receive prior vehicle state information corresponding to percentage of total loss of vehicles substantially similar to the vehicle;

analyze, by the total loss evaluation and handling system, the prior vehicle state information; and determine, by the total loss evaluation and handling system, the predetermined deceleration threshold corresponding to the vehicle state data.

20. The total loss evaluation and handling apparatus of claim 18, wherein the one or more processors are further caused to:

establish, by the total loss evaluation and handling system, a wireless data connection with one or more weather systems;

receive while the wireless data connection is established and from the one more weather systems, weather information corresponding to a geographic location of where the loss occurred; and apply a second total loss rule of the set of total loss rules to a portion of the weather information received.

* * * * *